(12) United States Patent
Matsumoto et al.

(10) Patent No.: US 6,286,008 B1
(45) Date of Patent: Sep. 4, 2001

(54) ELECTRONIC INFORMATION DISTRIBUTION METHOD AND RECORDING MEDIUM

(75) Inventors: Tatsuro Matsumoto, Kanagawa; Kousei Isomichi, Tokyo; Masahiro Hiraga, Tokyo; Chiaki Itoh, Tokyo, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/065,417

(22) Filed: Apr. 24, 1998

(30) Foreign Application Priority Data

Jul. 22, 1997 (JP) .................................................. 9-196212

(51) Int. Cl.[7] .................................................. G06F 12/30
(52) U.S. Cl. .......................................... 707/102; 713/156
(58) Field of Search ..................... 713/202, 201, 713/156; 705/45; 395/188; 707/102

(56) References Cited

U.S. PATENT DOCUMENTS 4,829,569 * 5/1989 Seth-Smith et al. ................. 380/324
5,509,070 * 4/1996 Schull ....................................... 380/4
5,548,645 * 8/1996 Ananda ................................. 395/188
5,638,513 * 6/1997 Ananda ................................. 395/188
5,761,309 * 6/1998 Ohashi et al. ........................ 713/156

* cited by examiner

Primary Examiner—Wayne Amsbury
(74) Attorney, Agent, or Firm—Staas & Halsey LLP

(57) ABSTRACT

The random numbers generated in the user side apparatus 1 or the server side apparatus 2 are exchanged by enciphering with the common secret information (e.g., password or the like) which is co-owned by both sides, so that only in case the random numbers generated by its own and transmitted have been returned, the related parties are mutually authenticated to start restoring the compressed contents CC. By this step, it becomes possible to take such method that the electronic information (contents) per se is subjected to certain processing (e.g., compression) and previously distributed in a recording medium such as CD-ROM as heretofore, and the information for restoring the processed electronic information is transmitted through the communication line. Accordingly, it becomes possible to obviate the danger of sending/receiving through the communication line the electronic information which can be of enormous data amount.

16 Claims, 16 Drawing Sheets

ELECTRONIC INFORMATION DISTRIBUTION METHOD AND RECORDING MEDIUM

BACKGROUND OF THE INVENTION

The present invention relates to a method for distributing contents, and more particularly digital data such as software, image data, etc. in a state of being recorded on a recording medium such as a CD-ROM, flexible disk, and the like.

In general, the electronic information including software, image, etc., which are called contents, are normally sold with charge in the state of being recorded on a recording medium such as a flexible disk, but there may be cases for the information to be distributed free of charge. In recent years, there may be such method that the contents are first subjected to data conversion (processing) such as compression, enciphering, etc. and the recorded recording medium is at first distributed free of charge, and the data is made fully usable only for one who desires use by giving the information for inverse data conversion. In such case, there may be two cases where the information for inverse data conversion is made free of charge and the case where it is supplied with charge. In any case, the security of such information is required.

Furthermore, in case of sending/receiving the information as above through a communications line, and with charge, naturally it becomes necessary to confirm the identities (authentication) of both parties, and accompanied with it, security of ID, password, etc. is necessitated.

In view of the situation as above, conventionally there has been adopted a procedure as shown for example in the schematic diagram of FIG. 1 or FIG. 2. In any case, a user side apparatus 2 uses a computer system used by a user who desires to utilize the contents, and a server side apparatus 1 uses a computer system of an organization which sells the contents with charge or distributes them free of charge.

Firstly, referring to FIG. 1, an example of the prior art is described. In this example, however, the contents C themselves are not at the user's hand but are transmitted under coded state from the server side apparatus 2 through the communication line 3.

In FIG. 1, in the user side apparatus 1, at first the user himself (herself) inputs the authentication code (hereinafter to be referred to as user ID) UID and a password PWu and transmits them to the server side apparatus 2 through the communication line 3.

In the server side apparatus 2, when the user ID UID and the password PWu are received through the communication line 3 from the user side apparatus 1, a password search unit 21 causes to search the user IDs of plural users stored in an ID/password data base 22 in advance and takes out the corresponding passwords PWc from the registered passwords. And, in the server side apparatus 2, a comparing unit 23 compares the received user's password PWu with the registered password PWc taken out from the ID/password data base 22, to carry out search for coincidence.

In case the two items have agreed as a comparison result by the comparing unit 23, an enciphering unit 24 enciphers the contents C with the registered password PWc, a concatenating unit 25 concatenates the deciphered program P to a enciphered contents E(C, PWc) enciphered by the enciphering unit 24, and have a transmission data P+E(C, PWc) obtained as a result transmitted to the user side apparatus 1 through the communication line 3.

In the user side apparatus 1 which has received the transmitted data P+E(C, PWc), a deciphering unit 11 deciphers the transmitted data P+E(C, PWc) by the password PWc previously inputted by the user himself, and obtains the contents C by the resulting deciphering program P.

Next, referring to FIG. 2, another example of the prior art is explained. In this example, however, the contents wherein the contents C have been enciphered (hereinafter to be referred to as enciphered contents) E(C, Key) per se are distributed to the user under the condition of previously recorded in a recording medium such as CD-ROM, and a key for deciphering is transmitted from the server side apparatus 2 through the communication line 3. In the user side apparatus 1, an enciphered contents E(C, Key) on hand are deciphered by the key transmitted from the server side apparatus 2.

In FIG. 2, in the user side apparatus 1, firstly the user inputs the user's own ID UID and password PWu, along with the contents ID C-ID described in the label of the recording medium such as a CD-ROM which is previously obtained, and have the apparatus transmit those data to the server side apparatus 2 through the communication line 3.

In the server side apparatus 2, when the apparatus receives the user ID UID and the password PWu from the user side apparatus 1 through the communication line 3, the password search unit 21 searches the user ID of plural users stored by previously registered in the ID/password data base 22 and takes out the corresponding password PWc out of the registered passwords. And, in the server side apparatus 2, the comparing unit 23 compares the received user's password PWu with the registered password PWc taken out from the ID/password data base 22 and carries out coincidence detection.

When, as a comparison result by the comparing unit 23, the password PWu received from the user side apparatus 1 coincides with the registered password PWc taken out from the ID/password data base 22, the enciphering unit 24 ciphers a deciphering key corresponding to the contents ID C-ID with the registered password PWc, and the concatenating unit 25 transmits the ciphered deciphering key E(Key, PWc) to the user side apparatus 1 as a remittance data through the communication line 3.

The user side apparatus 1 which received the deciphering key E(Key, PWc) as the transmission data deciphers the deciphering key E(Key, PWc) with the password PWu previously inputted by the user himself to obtain a deciphering key. And, by using this deciphering key, a second deciphering unit 112 deciphers the ciphered contents E(C, Key) already received on hand to give ultimately the contents C.

In any of the above examples, in case the contents C are to be offered with charge, a processing for charging money may be made on the part of the server side apparatus 2 at appropriate timing.

In the first prior art related in the above, because the contents are enciphered with the user's password on the server side and transmitted to the user side, the contents are required to be enciphered on each occasion, and a load of the server side is large. Moreover, because the enciphered contents are transmitted through the communication line, the communication cost becomes large, and further there may be a danger of error during communication to prevent receiving of perfect contents on the user side. Also, as the password is transmitted from the user side to the server side in a plain sentence, there is an apprehension for it to be leaked.

In the second prior art as above, it is necessary to manage the deciphering key in the unit of the contents on the server side. Also, in case this deciphering key has leaked, there is no preventive means, and although the contents per se are enciphered, the recording medium carrying the record is distributed free of charge in advance, and therefore there is an apprehension for the server to sustain a large amount of loss. Also, to the contents to be distributed in advance to the user, information (contents ID) for identifying it is required to be added. Furthermore, as the password is transmitted from the user side to the server side in a plain sentence, there is an apprehension for it to be leaked.

BRIEF SUMMARY OF THE INVENTION

The present invention has been made in reflection of the situation as above, wherein the electronic information per se (contents), after certain processing (e.g., compression), is previously distributed in a recording medium such as a CD-ROM as heretofore, and the information for restoring the processed electronic information is transmitted through the communication line. By this step, the risk of sending/receiving the electronic information which could be enormous data volume through the communication line can be obviated.

Alternatively, the random numbers generated on the user side apparatus or the server side apparatus are exchanged by enciphering with the common secret information (e.g., password or the like), so that only in case the random numbers generated by its own and transmitted has been returned, the related parties are mutually authenticated to start restoring the electronic information. This step allows to make the mutual authentication more strict.

Further, the random numbers generated in the user side apparatus is enciphered with the common secret information and transmitted to the server side apparatus, wherein the server side apparatus decodes the cipher with the common secret information, and again enciphers the random numbers with the common secret information and transmits them to the user side apparatus. The random numbers are again decoded with the common secret information on the user side apparatus, and in case the resulting random numbers are found to be the random numbers transmitted by the user himself to the server side apparatus, the user starts to restore the electronic information. By this step, it becomes possible to make the mutual authentication more precisely one another, and no leakage of information for restoring the electronic information occurs.

Additionally, the random numbers generated with the server side apparatus are transmitted to the user side apparatus. In the user side apparatus, the numbers are concatenated with the random numbers generated in its own, which are enciphered by using the common secret information, and transmitted to the user side apparatus. In the server side apparatus, the cipher is decoded with the common secret information, and if there can be obtained the random numbers generated and transmitted with the server side apparatus, then the user side apparatus is authenticated as being of the regular user. At this time, the server side apparatus takes out the random numbers generated and transmitted on the part of the user side apparatus, gives certain random information to it, enciphers it with the common secret information, and transmits it to the user side apparatus. In the user side apparatus, the cipher is decoded by the common secret information, and if the resulting random numbers are the random numbers generated by its own and transmitted, it starts to restore the electronic information. By this step, it becomes possible to make the mutual authentication more precisely one another, and no leakage of information for restoring the electronic information occurs.

Furthermore, on both the user side apparatus and the server side apparatus, a key for enciphering/deciphering is generated from the information inherent to the electronic information and the common secret information, and the information related to the user side apparatus (e.g., user ID, hardware ID, operating system ID, etc.) is enciphered and transmitted to the server side apparatus. On the server side apparatus, the cipher is decoded by the key, and the information related to the user side apparatus is taken out. Further, the server side apparatus adds the own generated random numbers to the information related to the user side apparatus, enciphers it, and transmits the data to the user side apparatus. In the user side apparatus, the cipher is decoded, and if the result proves to be the information generated by its own and transmitted to the server side apparatus, it starts to restore the electronic information. By this step, it becomes possible to make the mutual authentication more precisely one another, and no leakage of information for restoring the electronic information occurs.

An electronic information distribution method of the present invention for distributing an electronic information by starting a restoration program to restore a processed electronic information to an original electronic information by giving indication to a user side apparatus capable of reading a recording medium, in which the processed electronic information made by providing the original electronic information to be distributed with the predetermined processing and the restoration program for restoring the processed electronic information to the condition prior to the processing are recorded, through the communication line from a management side apparatus, is characterized in that, the user side apparatus generates a first information at random, generates a second information by providing the first information with a first processing which can be inversely processed with the management side apparatus, and transmits the second information to the management side apparatus, the management side apparatus restores the first information by providing the second information received from the user side apparatus with a processing inverse to the first processing, generates a third information by providing the restored first information with a second processing which can be inversely processed by the user side apparatus, and transmits the third information to the user side apparatus, and the user side apparatus restores the first information by providing the third information received from the management side apparatus with a processing inverse to the second processing, compares the restored first information with the first information generated by its own, and restores the processed electronic information by starting the restoration program when the two data show coincidence.

An electronic information distribution method of the present invention for distributing an electronic information by starting a restoration program to restore a processed electronic information to an original electronic information by giving indication to a user side apparatus capable of reading a recording medium, in which the processed electronic information made by providing the original electronic information to be distributed with the predetermined processing and the restoration program for restoring the processed electronic information to the condition prior to the processing are recorded, through the communication line from a management side apparatus, is characterized in that, the management side apparatus generates a first information at random, and transmits the first information to the user side apparatus, the user side apparatus generates a second information at random, generates a third information by providing the second information and the first information received from the management side apparatus with a first processing which can be inversely processed with the management side apparatus, and transmits the third information to the management side apparatus, the management side apparatus restores the first information and the second information by providing the third information received from the user side apparatus with a processing inverse to the first processing, compares the restored first information with the first information generated by its own, generates a fourth information by providing the restored second information with a second processing which can be inversely processed by the user side apparatus when the two data show coincidence, and transmits the fourth information to the user side apparatus, and the user side apparatus restores the second information by providing the fourth information received from the management side apparatus with a processing inverse to the second processing, compares the restored second information with the second information generated by its own, and restores the processed electronic information by starting the restoration program when the two data show coincidence.

The electronic information distribution method of the present invention as abovementioned is characterized in that the management side apparatus processes the first information by using a common information co-owned by the user side apparatus and the management side apparatus, and transmits it to the user side apparatus, and the user side apparatus once presents externally the processed first information received from the management side apparatus, and in case the presented information is re-inputted, provides it with the first processing.

An electronic information distribution method of the present invention for distributing an electronic information by starting a restoration program to restore a processed electronic information to an original electronic information by giving indication to a user side apparatus capable of reading a recording medium, in which the processed electronic information made by providing the original electronic information to be distributed with the predetermined processing and the restoration program for restoring the processed electronic information to the condition prior to the processing are recorded, through the communication line from a management side apparatus, is characterized in that, the user side apparatus generates a parameter by using a first information inherent to the electronic information and a common information co-owned by the user side apparatus and the management side apparatus, generates a third information by providing an inherent second information related to the user side apparatus with a first processing based on the parameter, and transmits the third information to the management side apparatus, the management side apparatus generates the parameter from the first information and the common information, restores the second information by providing the third information received from the user side apparatus with a processing inverse to the first processing by using the parameter, generates a fourth information by providing the restored second information with a second processing by using the parameter, and transmits the fourth information to the user side apparatus, and the user side apparatus restores the second information by providing the fourth information received from the management side apparatus with a processing inverse to the second processing by using the parameter, compares the restored second information with the inherent second information related to the user side apparatus, and restores the processed electronic information by starting the restoration program when the two data show coincidence.

The electronic information distribution method as described above is characterized in that the inherent second information related to the user side apparatus is any one or plurality of an information for identifying the user, an information inherent to the user side apparatus, or an information inherent to an operating system of the user side apparatus.

A computer program product of the present invention for electronic information distribution system from a management side apparatus to a user side apparatus, comprises a computer usable storage medium used at the user side apparatus and having computer readable program code means for distributing the electronic information by starting a restoration program to restore a processed electronic information to an original electronic information by giving indication to a user side apparatus capable of reading a recording medium, in which the processed electronic information made by providing the original electronic information to be distributed with the predetermined processing and the restoration program for restoring the processed electronic information to the condition prior to the processing are recorded, through the communication line from a management side apparatus, the computer readable program code means comprising: computer readable program code means for causing a computer to generate a first information at random; computer readable program code means for causing a computer to generate a second information by providing the first information with a first processing which can be inversely processed with the management side apparatus; computer readable program code means for causing a computer to transmit the second information to the management side apparatus; computer readable program code means for causing a computer to receive a fourth information generated and transmitted by the management side apparatus by providing the first information, which is restored by providing the second information received from the user side apparatus with a processing inverse to the first processing, with a second processing which can be inversely processed by the user side apparatus; computer readable program code means for causing a computer to restore the first information by providing the fourth information received from the management side apparatus with a processing inverse to the second processing; computer readable program code means for causing a computer to compare the restored first information with the first information generated by itself; and computer readable program code means for causing a computer to start the restoration program when the comparison result between the two data show coincidence.

A computer program product of the present invention for electronic information distribution system from a management side apparatus to a user side apparatus, comprises a computer usable storage medium used at the management side apparatus and having computer readable program code means for distributing the electronic information by starting a restoration program to restore a processed electronic information to an original electronic information by giving indication to a user side apparatus capable of reading a recording medium, in which the processed electronic information made by providing the original electronic information to be distributed with the predetermined processing and the restoration program for restoring the processed electronic information to the condition prior to the processing are recorded, through the communication line from a management side apparatus, the computer readable program code means comprising: computer readable program code means for causing a computer to receive a second information generated and transmitted by the user side apparatus by providing a first information, which is generated at random with a first processing that can be inversely processed by the management side apparatus; computer readable program code means for causing a computer to restore the first information by providing the received second information with a processing inverse to the first processing; computer readable program code means for causing a computer to generate a fourth information by providing the restored first information with a second processing which can be inversely processed with the user side apparatus; and computer readable program code means for causing a computer to transmit the fourth information to the user side apparatus.

A computer program product of the present invention for electronic information distribution system from a management side apparatus to a user side apparatus, comprises a computer usable storage medium used at the user side apparatus and having computer readable program code means for distributing the electronic information by starting a restoration program to restore a processed electronic information to an original electronic information by giving indication to a user side apparatus capable of reading a recording medium, in which the processed electronic information made by providing the original electronic information to be distributed with the predetermined processing and the restoration program for restoring the processed electronic information to the condition prior to the processing are recorded, through the communication line from a management side apparatus, the computer readable program code means comprising: computer readable program code means for causing a computer to receive a first information generated at random and transmitted by the management side apparatus; computer readable program code means for causing a computer to generate a second information at random; computer readable program code means for causing a computer to generate a third information by providing the second information and the first information received from the management side apparatus with a first processing that can be processed inversely by the management side apparatus; computer readable program code means for causing a computer to transmit the third information to the management side apparatus; computer readable program code means for causing a computer to receive a fourth information generated and transmitted by the management side apparatus by providing the third information received from the user side apparatus with a processing inverse to the first processing to restore the first information and the second information, comparing the restored first information with the first information generated by itself, and the restored second information is provided with a second processing which can be inversely processed by the user side apparatus when the two data show coincidence; computer readable program code means for causing a computer to restore the second information by providing the received fourth information with a processing inverse to the second processing; computer readable program code means for causing a computer to compare the restored second information with the second information generated by itself; and computer readable program code means for causing a computer to start the restoration program when the comparison result between the two data show coincidence.

A computer program product of the present invention for electronic information distribution system from a management side apparatus to a user side apparatus, comprises a computer usable storage medium used at the management side apparatus and having computer readable program code means for distributing the electronic information by starting a restoration program to restore a processed electronic information to an original electronic information by giving indication to a user side apparatus capable of reading a recording medium, in which the processed electronic information made by providing the original electronic information to be distributed with the predetermined processing and the restoration program for restoring the processed electronic information to the condition prior to the processing are recorded, through the communication line from a management side apparatus, the computer readable program code means comprising: computer readable program code means for causing a computer to generate a first information at random; computer readable program code means for causing a computer to transmit the first information to the user side apparatus; computer readable program code means for causing a computer to receive a third information generated and transmitted by the user side apparatus by providing a second information generated at random and the first information received from the management side apparatus with a first processing which can be inversely processed with the management side apparatus; computer readable program code means for causing a computer to restor the first information and the second information by providing the third information received from the user side apparatus with a processing inverse to the first processing; computer readable program code means for causing a computer to compare the restored first information with the first information generated by itself; computer readable program code means for causing a computer to generate a fourth information by providing the restored second information with a second processing which can be inversely processed with the user side apparatus when the comparison result between the two data show coincidence; and computer readable program code means for causing a computer to transmit the fourth information to the user side apparatus.

A computer program product of the invention for electronic information distribution system from a management side apparatus to a user side apparatus, comprises a computer usable storage medium used at the user side apparatus and having computer readable program code means for distributing the electronic information by starting a restoration program to restore a processed electronic information to an original electronic information by giving indication to a user side apparatus capable of reading a recording medium, in which the processed electronic information made by providing the original electronic information to be distributed with the predetermined processing and the restoration program for restoring the processed electronic information to the condition prior to the processing are recorded, through the communication line from a management side apparatus, the computer readable program code means comprising: computer readable program code means for causing a computer to generate a parameter by using a first information inherent to the electronic information and a common information previously co-owned by the user side apparatus and the management side apparatus; computer readable program code means for causing a computer to generate a third information by providing an inherent second information related to the user side apparatus with a first processing based on the parameter; computer readable program code means for causing a computer to transmit the third information to the management side apparatus; computer readable program code means for causing a computer to receive a fourth information generated and transmitted by the management side apparatus by providing the third information received from the user side apparatus with a processing inverse to the first processing to restore the second information, and providing the restored second information with the second processing by using the parameter; computer readable program code means for causing a computer to restore the second information by providing the received fourth information with a processing inverse to the second processing; computer readable program code means for causing a computer to compare the restored second information with the inherent second information related to the user side apparatus; and computer readable program code means for causing a computer to start the restoration program when the comparison result between the two data show coincidence.

A computer program product of the present invention for electronic information distribution system from a management side apparatus to a user side apparatus, comprises a computer usable storage medium used at the management side apparatus and having computer readable program code means for distributing the electronic information by starting a restoration program to restore a processed electronic information to an original electronic information by giving indication to a user side apparatus capable of reading a recording medium in which the processed electronic information made by providing the electronic information to be distributed with the predetermined processing and the restoration program for restoring the processed electronic information to the condition prior to the processing are recorded, through the communication line from a management side apparatus, the computer readable program code means comprising: computer readable program code means for causing a computer to receive a third information generated and transmitted by the user side apparatus by providing an inherent second information related to the user side apparatus with a first processing based on a parameter which is generated by using a common information previously co-owned by the first information inherent to the electronic information; computer readable program code means for causing a computer to generate the parameter from the first information and the common information; computer readable program code means for causing a computer to restore the second information by providing the third information received from the user side apparatus with a processing inverse to the first processing by using the parameter;

computer readable program code means for causing a computer to generate a fourth information by providing the restored second information with a second processing by using the parameter; and computer readable program code means for causing a computer to transmit the fourth information to the user side apparatus.

The computer program product of the present invention as described above two inventions are characterize in that the inherent second information related to the user side apparatus is any one or plurality of an information for identifying the user, an information inherent to the user side apparatus, or an information inherent to an operating system of the user side apparatus.

The above and further objects and features of the invention will more fully be apparent from the following detailed description with accompanying drawings.

DESCRIPTION OF THE PREFERRED EMBODIMENTS

Hereinafter, the invention is described in detail based on the drawings which show the embodiments thereof. In the first place, the system constitution for practicing the electronic information distribution method of the invention is described, next the principle of the method of the present invention is described, and thereafter the actual embodiment is explained.

Figure 1:
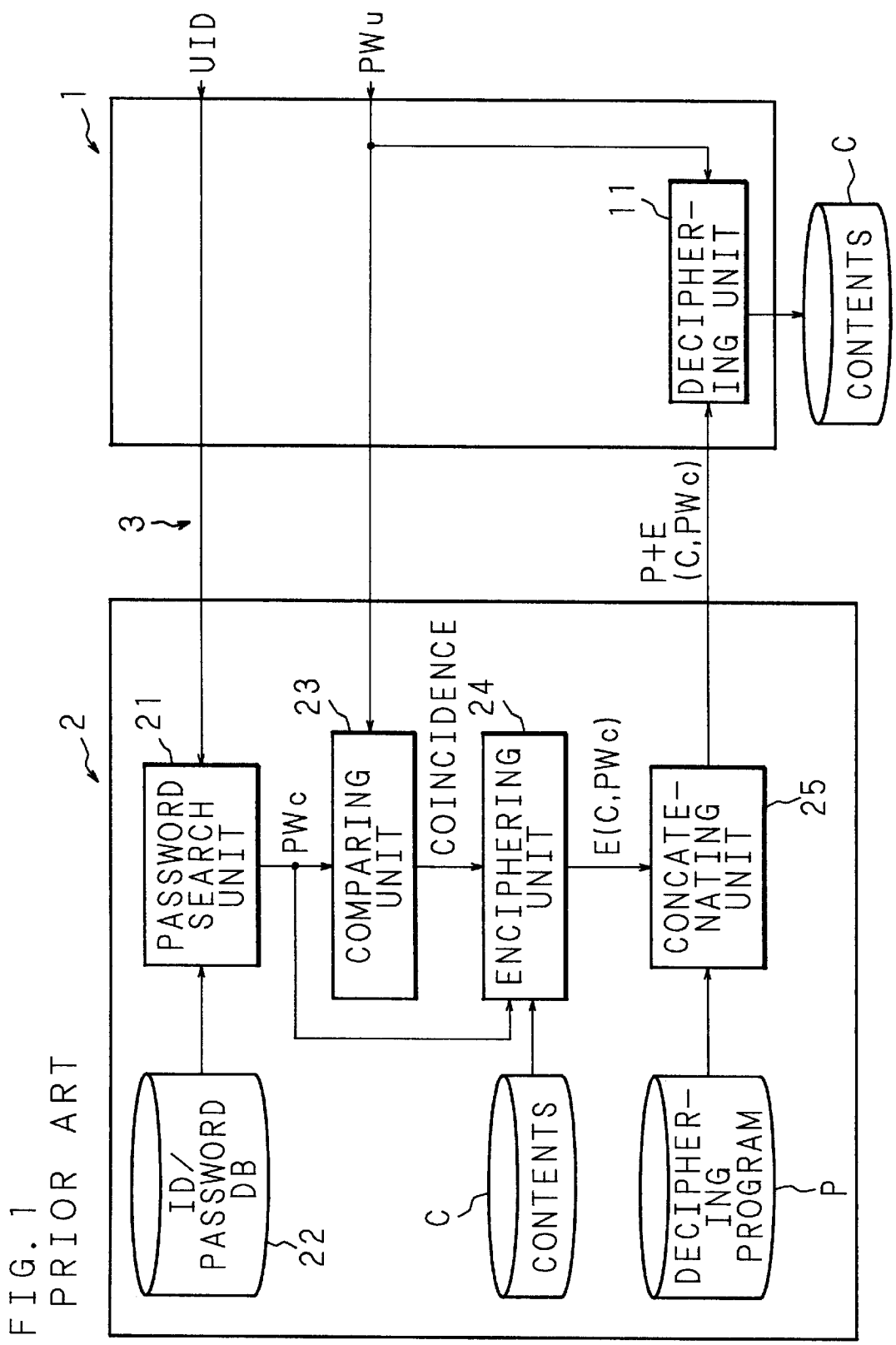
FIG. 1 is an explanatory view of an example of the prior art.
Figure 2:
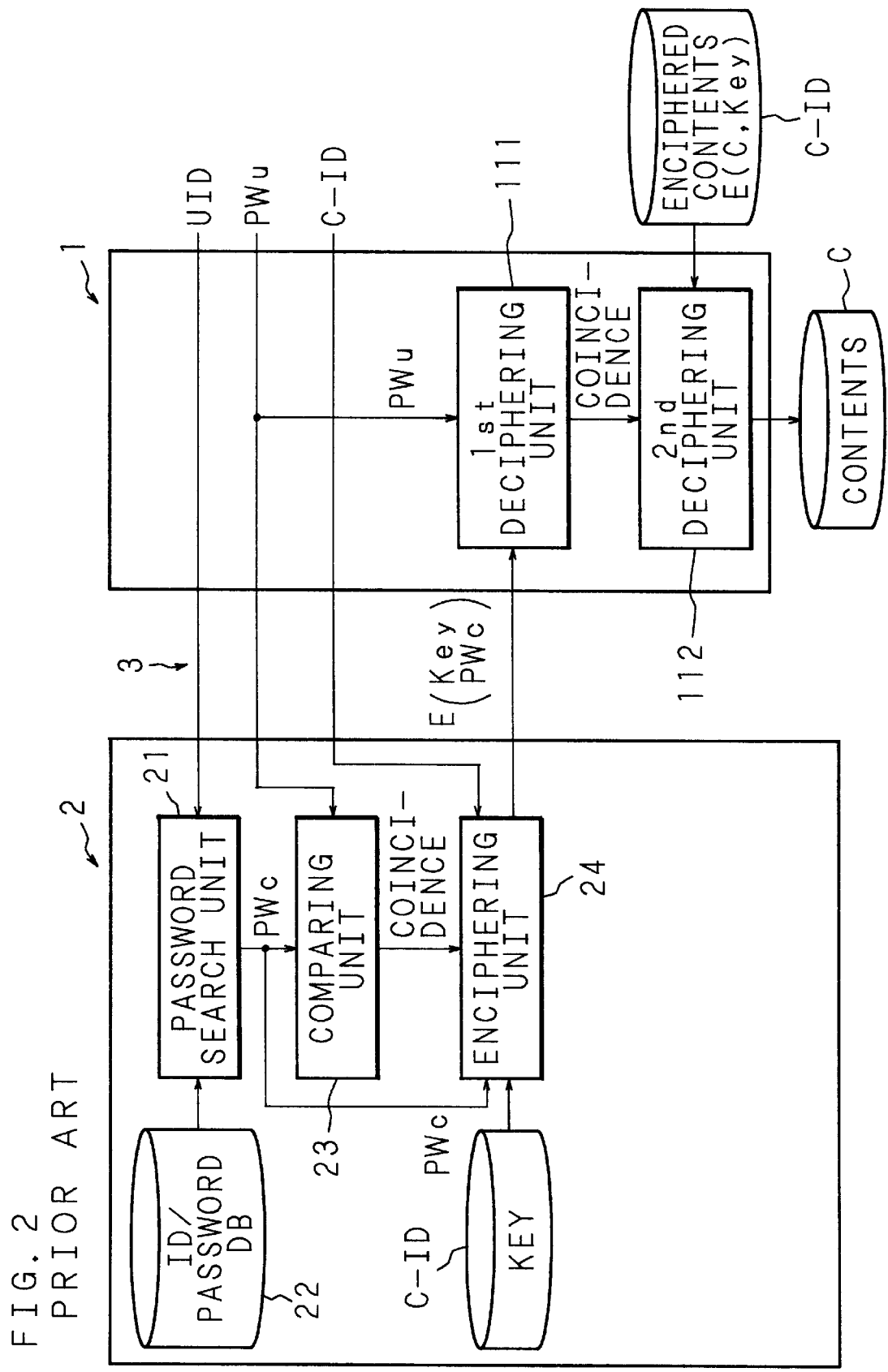
FIG. 2 is an explanatory view of another example of the prior art.
Figure 3:
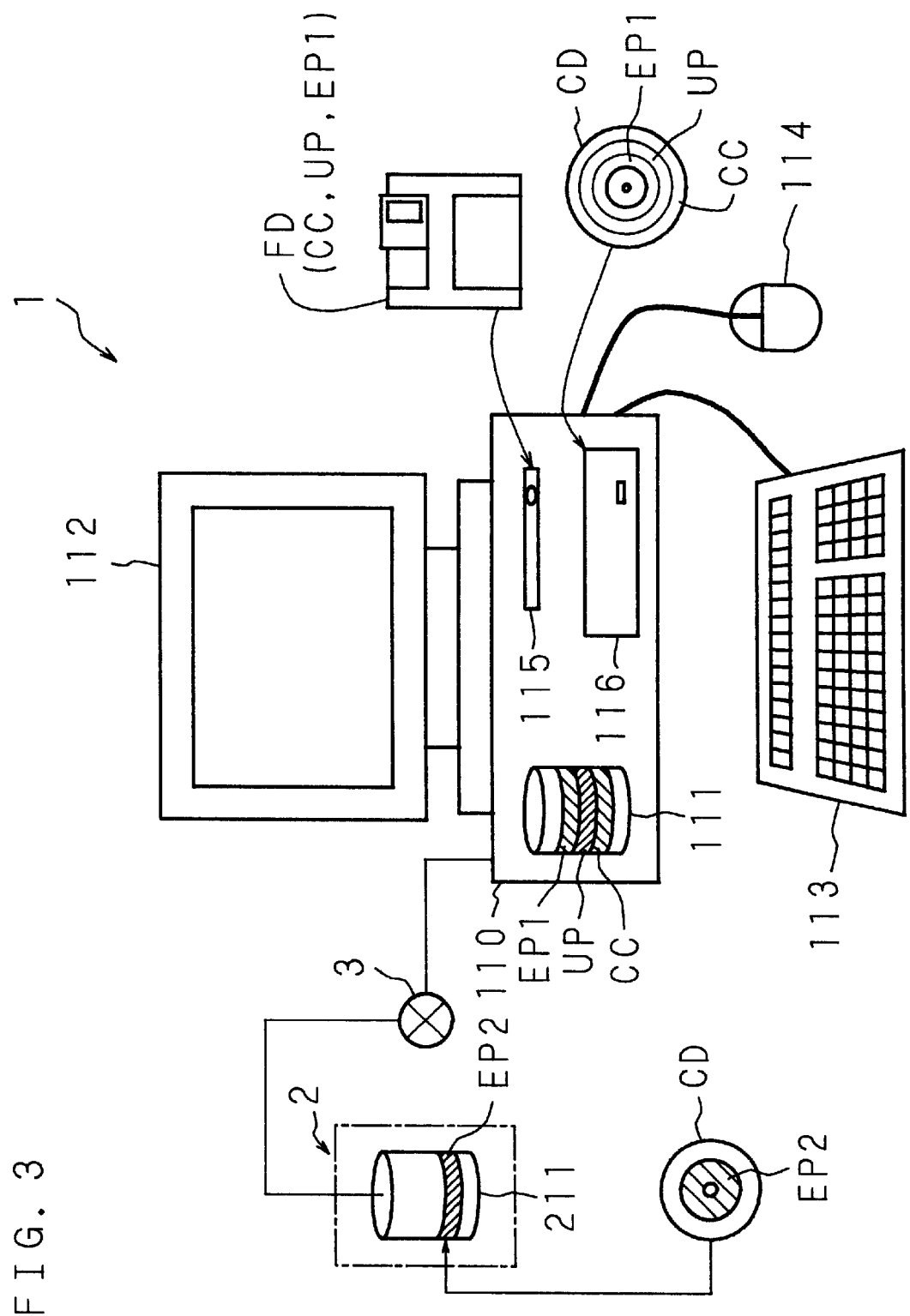
FIG. 3 is a schematic diagram showing an example of the system constitution to be used for the practice of the method of the present invention.

FIG. 3 is a schematic diagram showing an example of the system constitution to be used for the practice of the method of the present invention. In FIG. 3, reference numeral 1 denotes a computer system used by the user (hereinafter to be referred to as the user side apparatus) who utilizes the electronic information (hereinafter to be referred to as contents) to be distributed with charge or free of charge according to the method of the present invention, and reference numeral 2 denotes a management side apparatus to be operated by the party who distributes the contents C with charge or free of charge personally or by committing to the other party. The user side apparatus 1 and the server side apparatus 2 are connected for example by the communication line 3 such as an ordinary public telephone line, and the so-called computer communication can be made.

The user side apparatus 1 is constituted roughly by a body 111, a display 112 and input operation means (keyboard 113, mouse 114, etc.). The body 111 is furnished with a hard disk drive (HDD) 111, a flexible disk drive (FDD) 115, a CD-ROM drive 116 and non-illustrated CPU, RAM, ROM, and the like, as in the ordinary computer system.

In the CD-ROM drive 116 a CD-ROM CD is loaded. In this CD-ROM CD there are recorded digital data CC which is made for example by compression processing the contents C distributed by the method of the present invention, a program UP for uncompressing it, and the program necessary for executing the method of the present invention (hereinafter to be referred to as the execution program) EP1. In the FDD 115, the flexible disk FD is loaded. In this flexible disk FD, there may be recorded the digital data CC which is made by for example compressing the contents C, a program UP for uncompressing it, and further the execution program EP1, or it is of course possible to utilize the recording medium other than the CD-ROM CD or flexible disk FD.

In any case, the digital data CC which is made by for example compressing the contents C, a program UP for uncompressing it, and further the execution program EP1 are once memorized in the HDD 111 of the body 110 before actual use.

On the other hand, the server side apparatus 2 is also basically an ordinary computer system, being provided with an HDD 211. In this HDD 211, there is installed an execution program EP2 necessary for executing the method of the present invention from the recording medium such as for example a CD-ROM CD and memorized.

Figure 4:
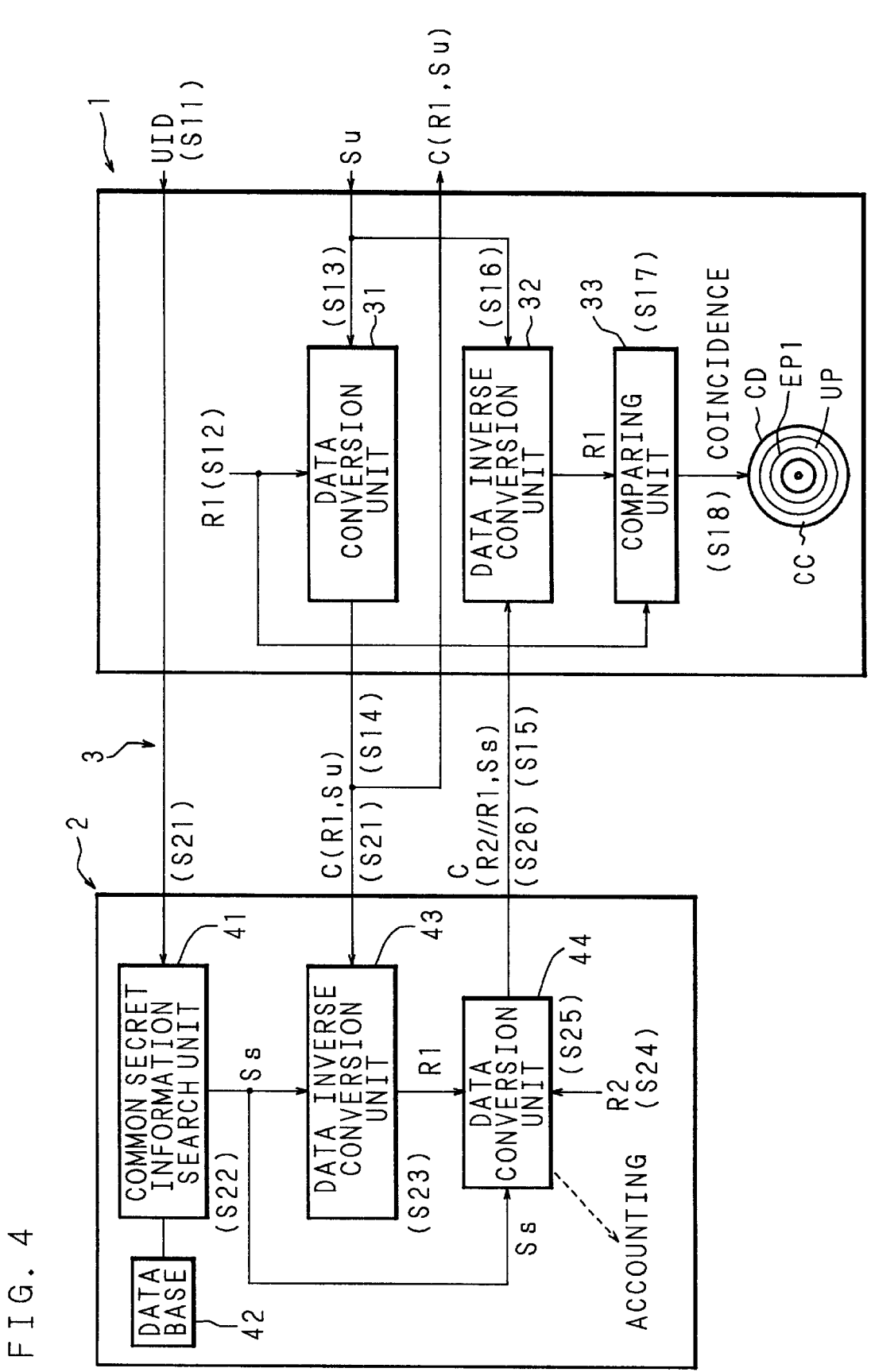
FIG. 4 is a schematic diagram for illustrating the first principle of the method of the present invention.
Figure 5:
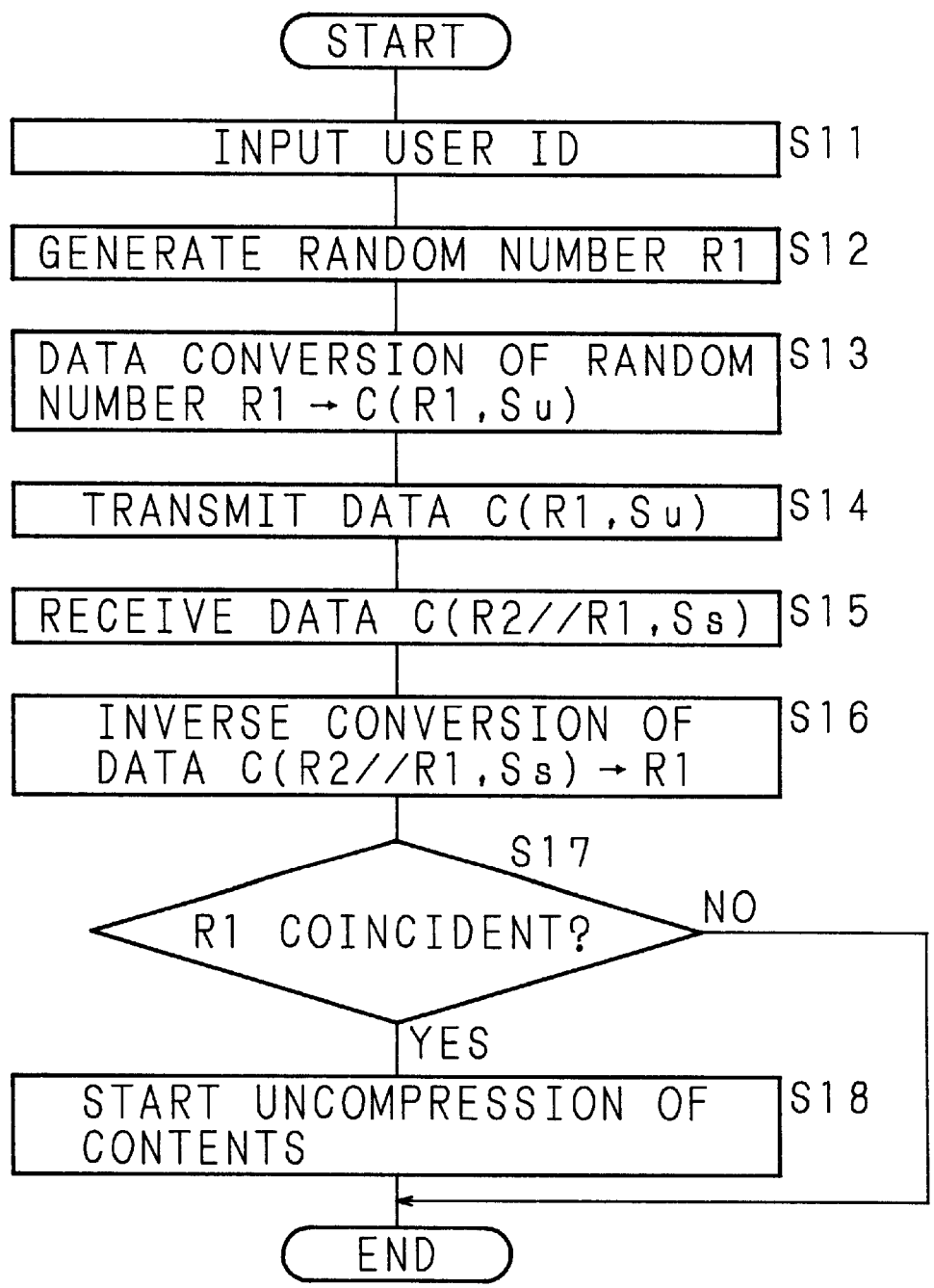
FIG. 5 is a flowchart showing the processing procedures of the user side apparatus of the first principle of the method of the present invention.
Figure 6:
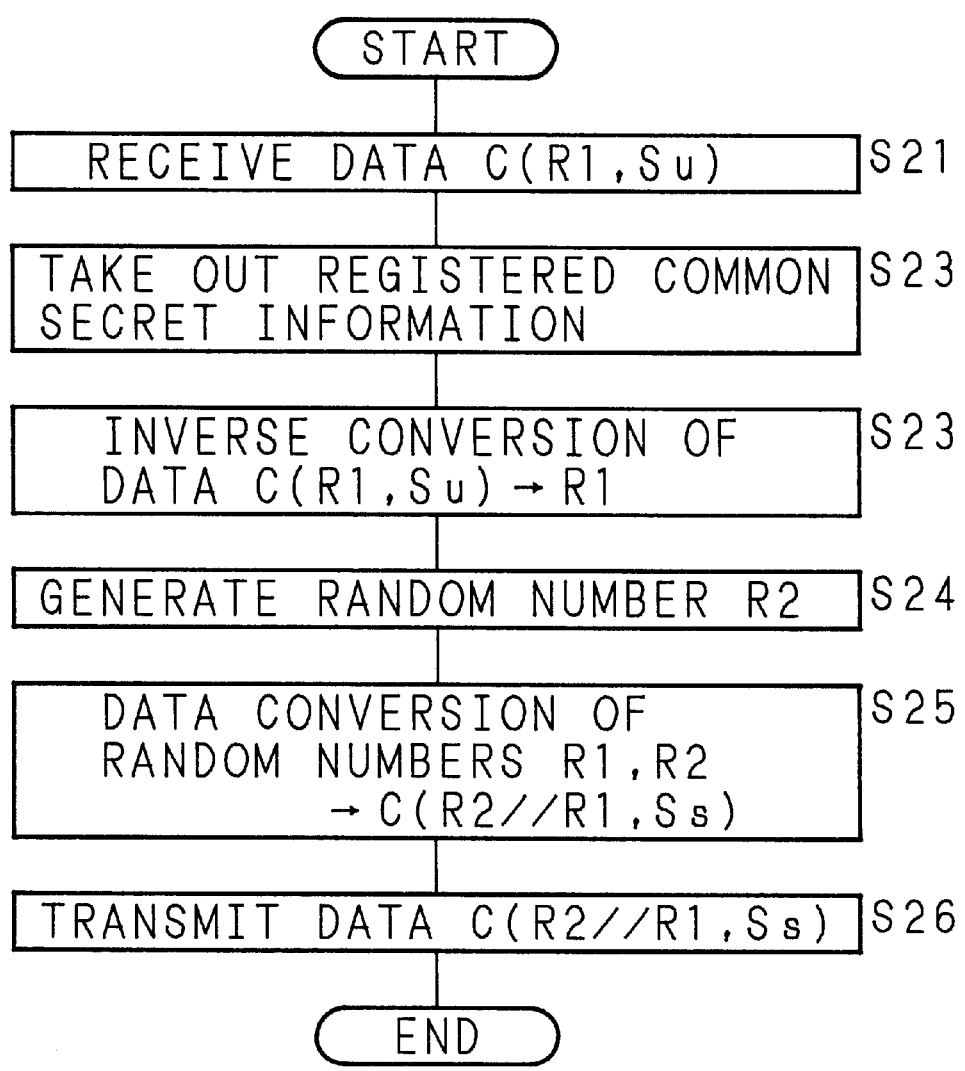
FIG. 6 is a flowchart showing the processing procedures of the server side apparatus of the first principle of the method of the present invention.

FIG. 4 is a schematic diagram for illustrating the first principle of the method of the present invention; FIG. 5 is a flowchart showing the processing procedures of the user side apparatus 1 thereof; and FIG. 6 is a flowchart showing the processing procedures of the server side apparatus 2.

In each explanation on the principle below, the contents C per se are recorded under the condition of the compressed digital data CC as the self-uncompression type software and distributed to the user free of charge. The CD-ROM CD further carries records of the uncompressing program UP for self-uncompressing the compressed digital data CC, and an execution program EP1 for the user side apparatus 1 for executing the processing for starting the uncompressing program UP. Also, what actually operations in the user side apparatus 1 is an execution program EP1, and what actually operations in the server side apparatus 2 is the execution program EP2.

In FIG. 4, in the user side apparatus 1, firstly, when the user inputs the own user authentication number (hereinafter to be referred to as the user ID) UID, the execution program EP1 transmits it to the server side apparatus 2 through the communication line 3 (Step S11). At the same time, the user inputs a common secret information Su in the user side apparatus 1. When this common secret information Su is inputted, the execution program EP1 generates the random information (random number) R1 (Step S12) and using the random number R1 as a parameter of the common secret information Su, provides the data conversion unit 31 with the data conversion to generate the data C(R1, Su) (Step S13) and presents them to the user.

When the user again inputs the data C(R1, Su) presented by the execution program EP1 to the user side apparatus 1, the execution program EP1 transmits it to the server side apparatus 2 through the communication line 3 (Step S14).

In the server side apparatus 2, when the user ID UID and data C(R1, Su) are received from the user side apparatus 1 through the communication line 3 (Step S21), the execution program EP2 causes a common secret information search unit 41 to search the user ID UID of plural users registered and stored in a data base 42 to have it take out the corresponding registered common secret information Ss from the registered common secret information (Step S22). And, the execution program EP2 causes a data inverse conversion unit 43 to convert inversely the received data C(R1, Su) with the registered common secret information Ss taken out from the data base 42 to obtain a random number R1 (Step S23).

Next, in the server side apparatus 2, the execution program EP2 newly causes to generate the random information (random number) R2 (Step S24), and the random number R1 obtained by the data inverse conversion unit 43 and the random number R2 are concatenated, the resulting data is read out from the data base 42, and using the registered common secret information Ss read out from the data base 42, the concatenated data is converted by a data conversion unit 44 to generate a data C(R2//R1, Ss) (Step S25), which is caused to transmit to the user side apparatus 1 through the communication line 3 (Step S26).

At the time when the data C(R2//R1, Ss) is generated in the data conversion unit 44, if money charging processing is necessary, such processing is executed.

When this data C(R2//R1, Ss) is received (Step S15), in the user side apparatus 1, the execution program EP1 causes a data inverse conversion unit 32 to make inverse conversion with the common secret information Su inputted previously by the user himself to obtain a random number R1 (Step S16). The execution program EP1 compares the random number R1 obtained in the data inverse conversion unit 32 with the random number R1 generated previously by its own at the comparing unit 33 (Step S17), and if they show coincidence, then the program starts the self-uncompression program UP to have the compressed contents CC start to be uncompressed (Step S18).

Figure 7:
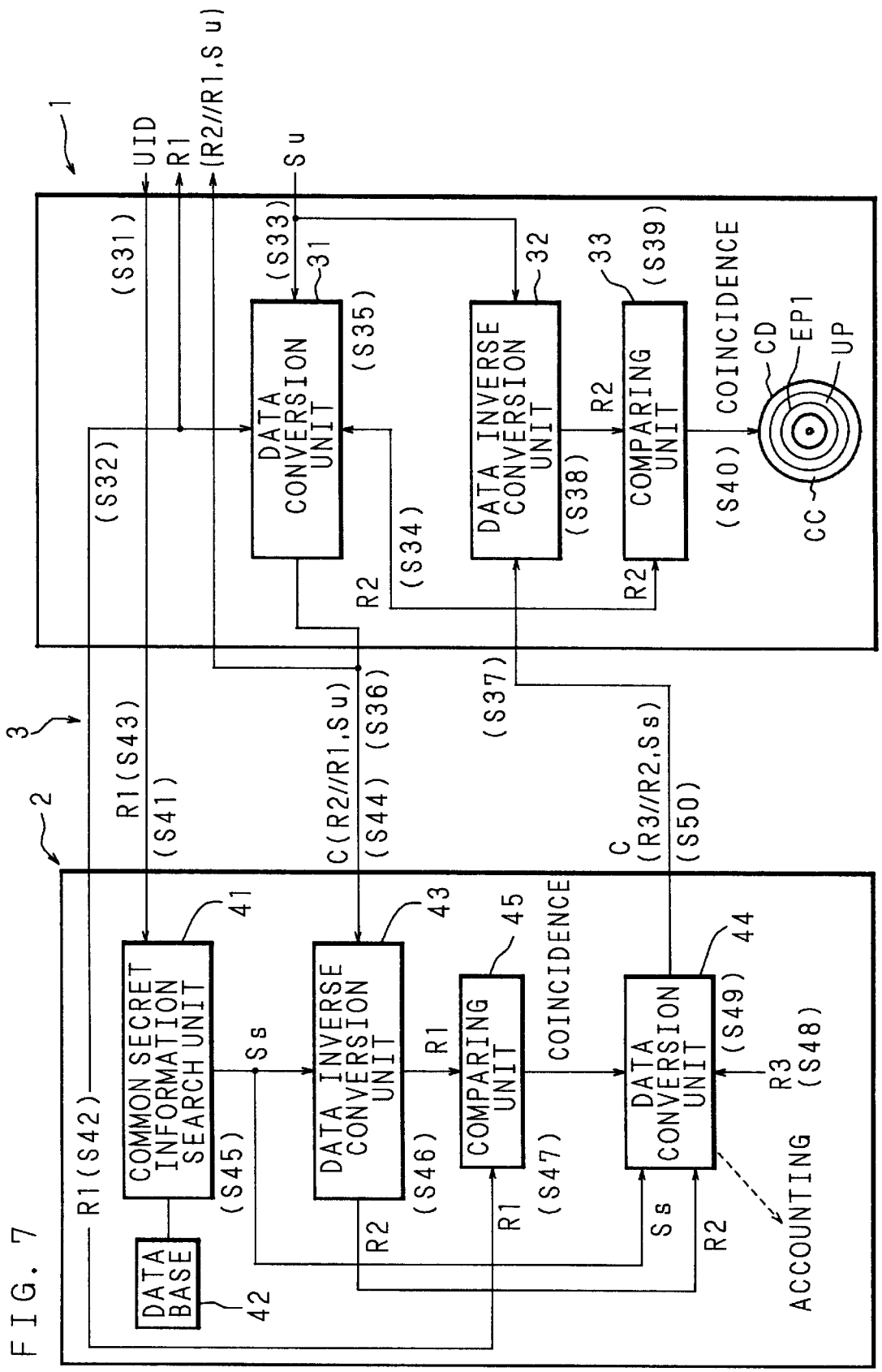
FIG. 7 is a schematic diagram for illustrating the second principle of the method of the present invention.
Figure 8:
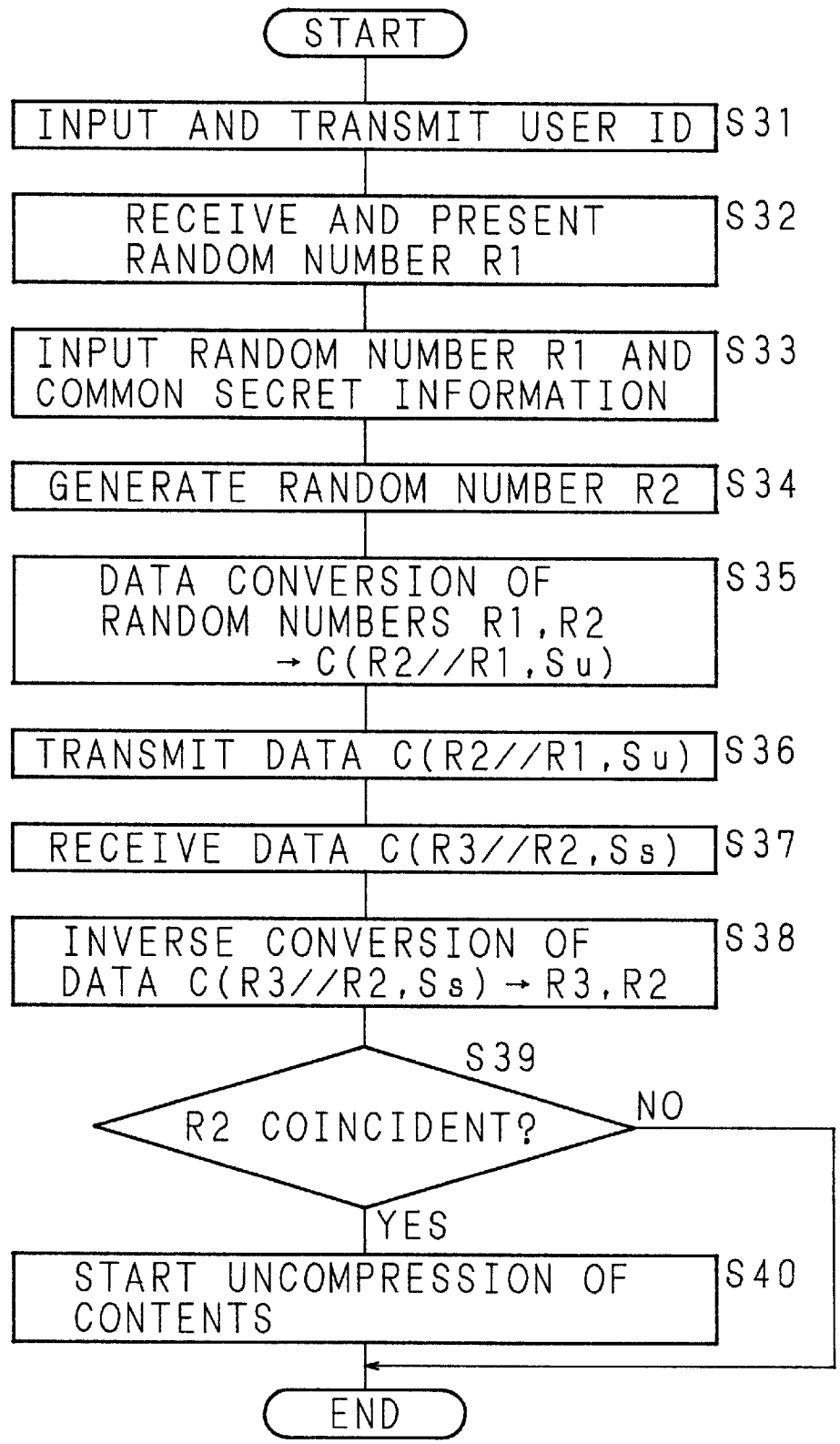
FIG. 8 is a flowchart showing the processing procedures of the user side apparatus of the second principle of the method of the present invention.
Figure 9:
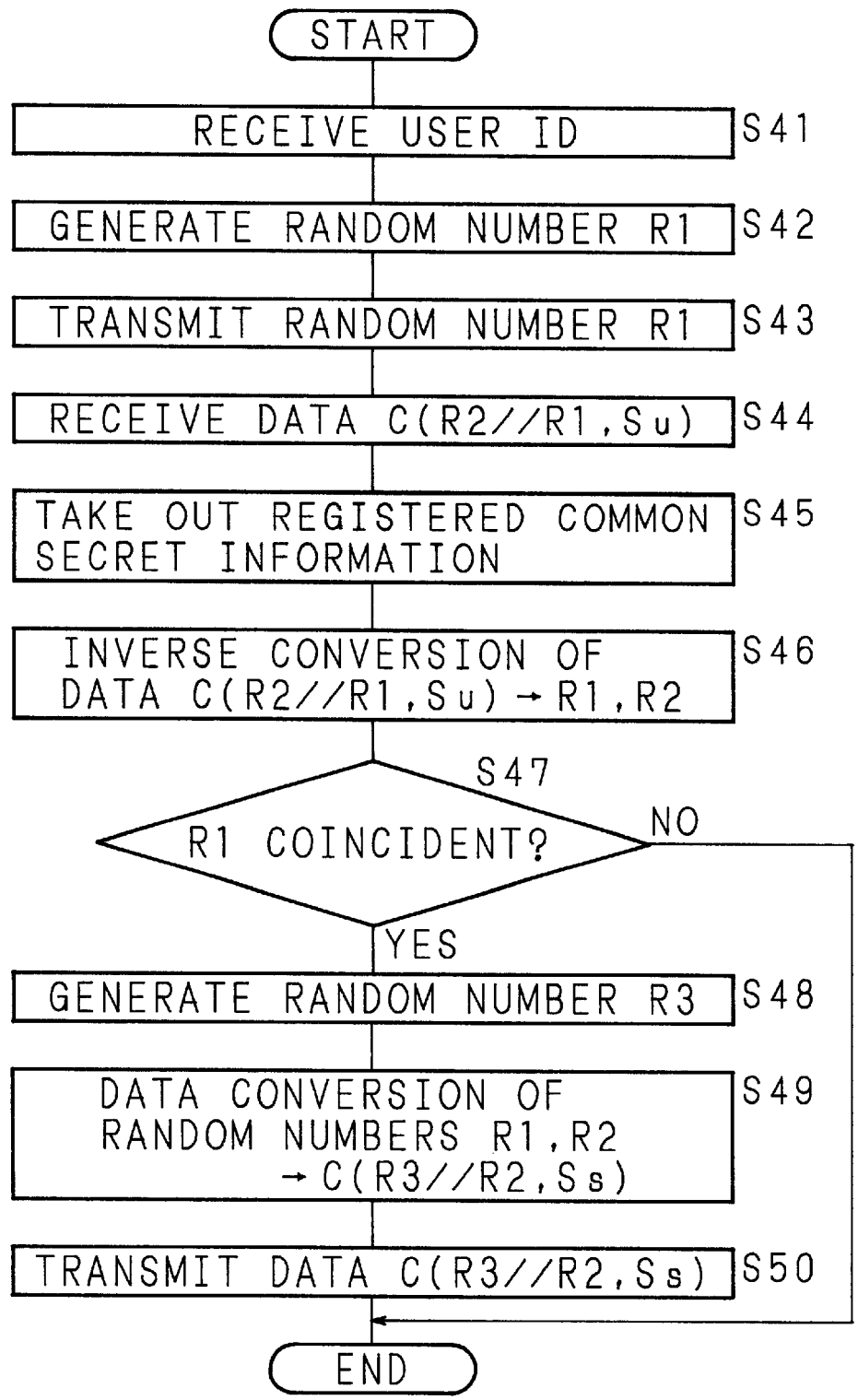
FIG. 9 is a flowchart showing the processing procedures of the server side apparatus of the second principle of the method of the present invention.

FIG. 7 is a schematic diagram for illustrating the second principle of the method of the present invention; FIG. 8 is a flowchart showing the processing procedures of the user side apparatus 1; and FIG. 9 is a flowchart showing the processing procedures of the server side apparatus 2.

In the user side apparatus 1, at first, when the user inputs his own ID UID, the execution program EP1 transmits it to the server side apparatus 2 through the communication line 3 (Step S31).

On the other hand, when the server side apparatus 2 receives the user ID UID from the user side apparatus 1 (Step S41), it generates a random information (random number) R1 (Step S42) and transmits it to the user side apparatus 1 through the communication line 3 (Sep S43). The user side apparatus 1 receives the random number R1 and presents it to the user (Step S32).

The user inputs the random number R1 and the common secret information Su presented from the server side apparatus 2 in the user side apparatus 1 (Step S33). When this random number R1 and the common secret information Su are inputted, the execution program EP1 generates the random information (random number) R2 (Step S34), and, using the common secret information Su as a parameter, it causes the data conversion unit 31 to make data conversion in concatenation of the random number RI with the random number R2 to generate the data C(R2//R1, Su) (Step S35) and presents the results to the user.

When the data C(R2//R1, Su) presented by the execution program EP1 is inputted by the user to the user side apparatus 1 again, the execution program EP1 causes it to transmit to the server side apparatus 2 through the communication line 3 (Step S36).

When the server side apparatus 2 receives the data C(R2//R1, Su) from the user side apparatus 1 through the communication line 3 (Step S44), the execution program EP2 causes the common secret information search unit 41 to search the user ID UID of plural users stored by registration in advance in the data base 42 according to the user ID UID previously received and to take out the corresponding registered common secret information Ss from the registered common secret information (Step S45). And the execution program EP2 causes the data inverse conversion unit 43 to convert inversely the received data C(R2//R1, Su) with the registered common secret information Ss taken out from the data base 42 to obtain random numbers R1, R2 (Step S46).

Next, in the server side apparatus 2, the execution program EP2 causes a comparing unit 45 to compare the random number R1 taken out by the data inverse conversion unit 43 with the random number R1 previously transmitted to the user side apparatus 1 (Step S47), and if they show coincidence, it causes to generate newly the random information (random number) R3 (Step S48), and using the registered common secret information Ss which is obtained by reading out from the data base 42 it causes the data conversion unit 44 to convert the data obtained by concatenating the random number R3 with the random number R2 obtained previously by the data inverse conversion unit 43 to generate the data C(R3//R2, Ss) (Step S49), and have it transmitted to the user side apparatus 1 through the communication line 3 (Step S50).

If necessary, money charging is executed at the point of generating the data C(R3//R2, Ss).

When this data C(R3//R2, Ss) is received (Step S37), in the user side apparatus 1, the execution program EP1 causes the inverse conversion to be made with the common secret information Su inputted by the user himself prior to the data inverse conversion (Step S38) to obtain random number R2. The execution program EP1 causes the comparing unit 33 to compare the random number R2 obtained in the data inverse conversion unit 32 with the random number R2 previously generated by its own (Step S39), and if they show coincide, then it starts the self-uncompression program UP and have the uncompression of the compressed contents CC started (Step S40).

Figure 10:
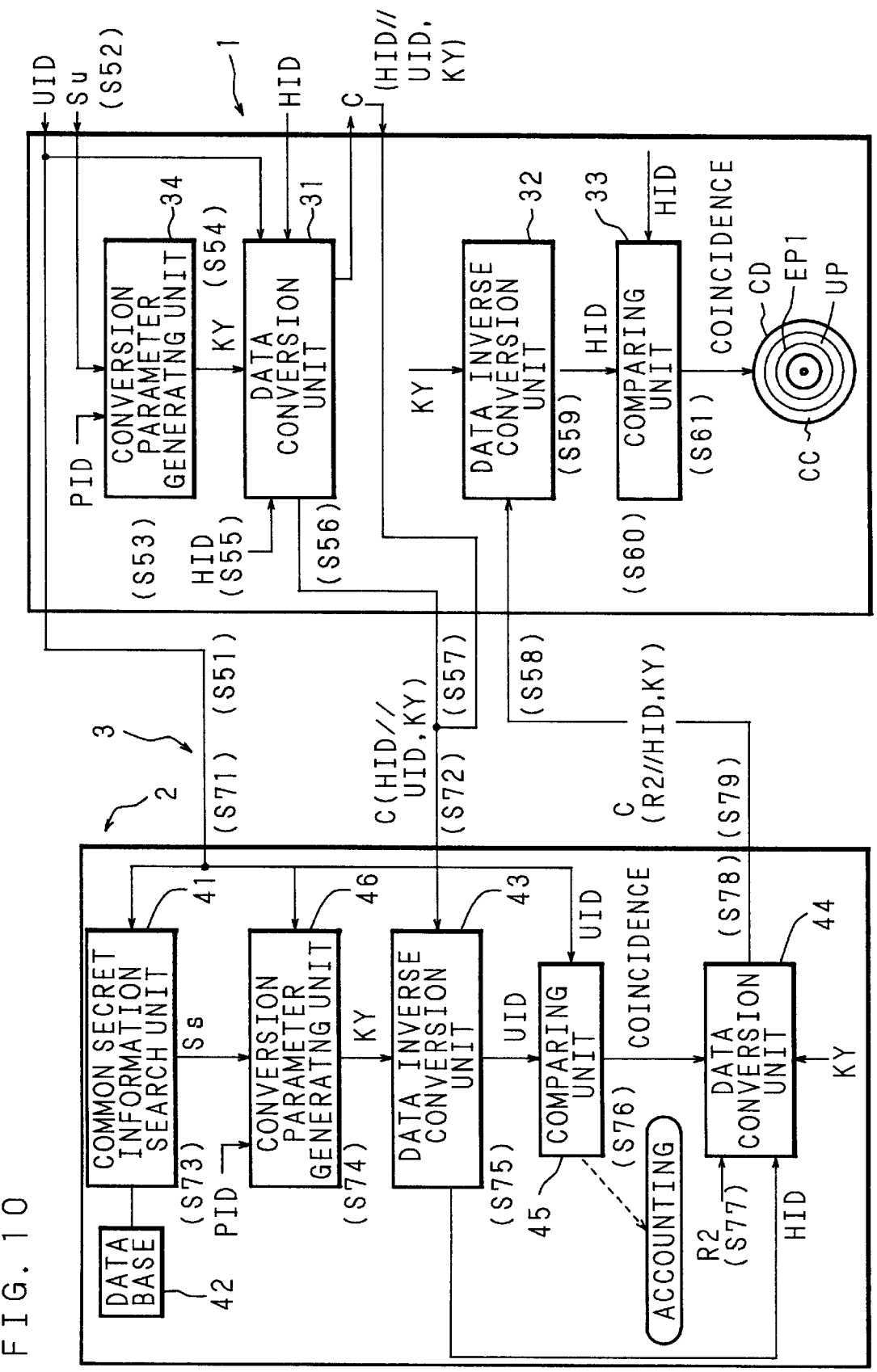
FIG. 10 is a schematic diagram for illustrating the third principle of the method of the present invention.
Figure 11:
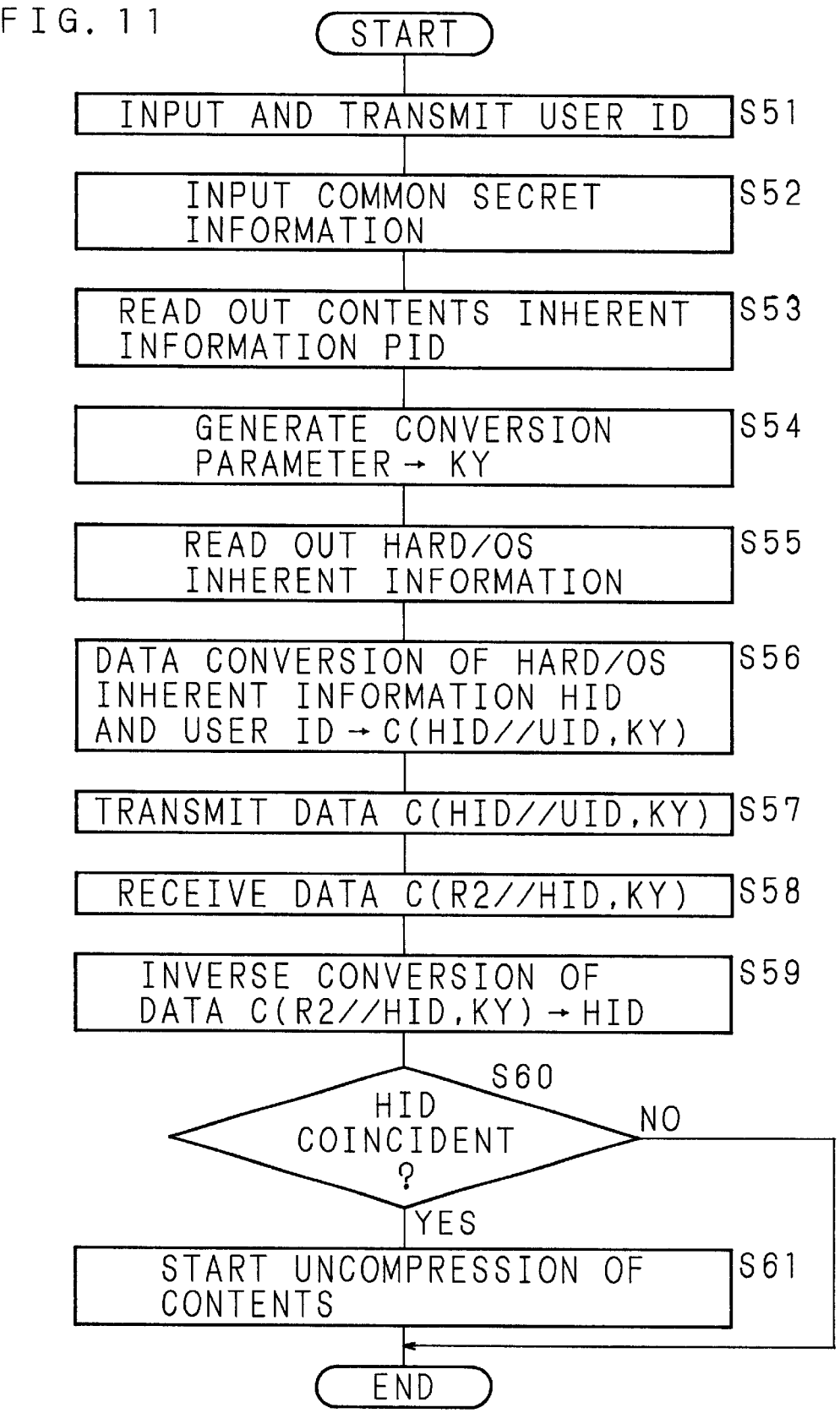
FIG. 11 is a flowchart showing the processing procedures of the user side apparatus of the third principle of the method of the present invention.
Figure 12:
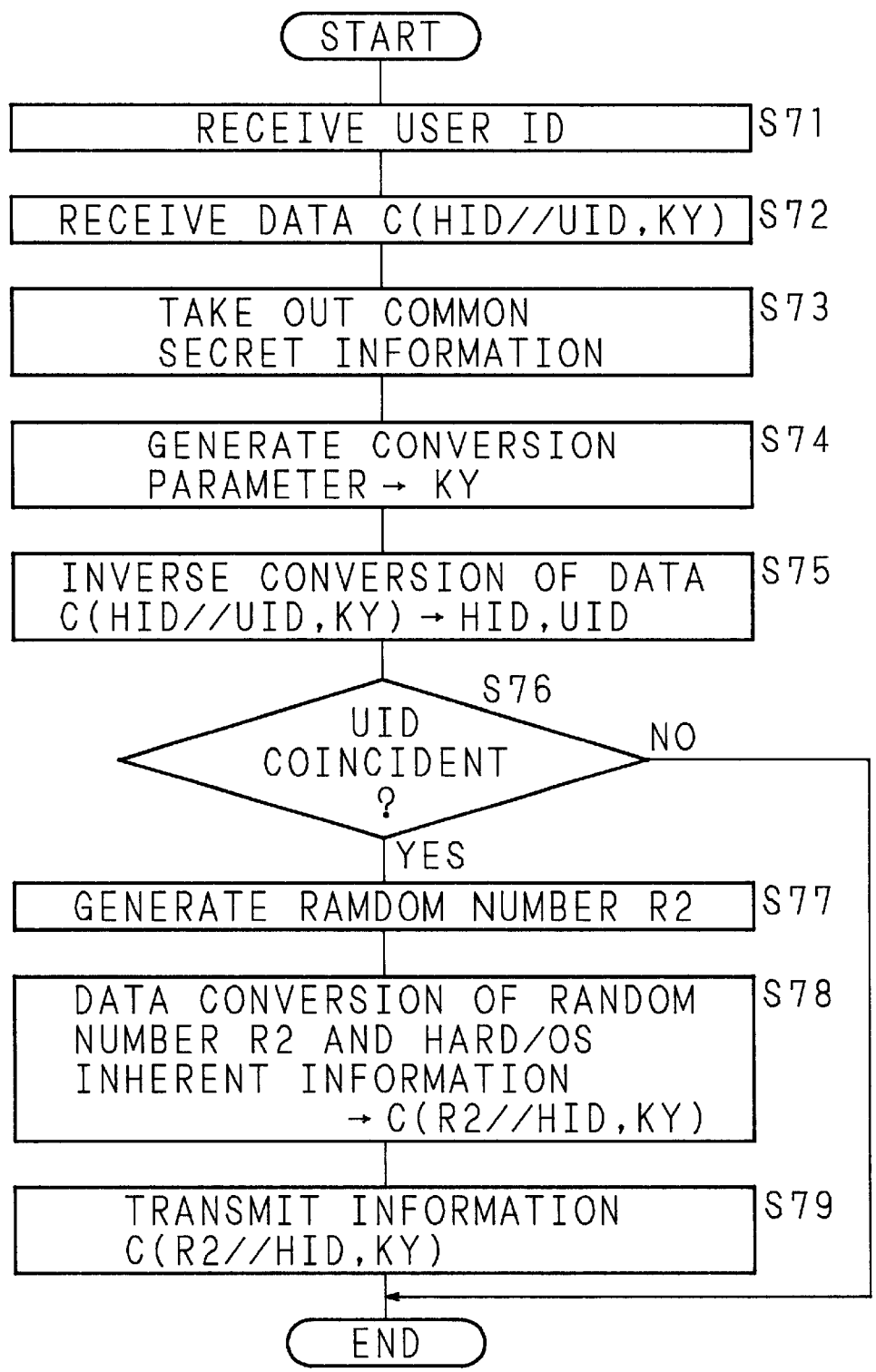
FIG. 12 is a flowchart showing the processing procedures of the server side apparatus of the third principle of the method of the present invention.

FIG. 10 is a schematic diagram for illustrating the third principle of the invention; FIG. 11 is a flowchart showing the processing procedures of the user side apparatus 1; and FIG. 12 is a flowchart showing the processing procedures of the server side apparatus 2.

In the user side apparatus 1, firstly, when the user inputs the own user ID UID, the execution program EP1 transmits it to the server side apparatus 2 through the communication line 3 (Step S51). At the same time, the user inputs the common secret information Su in the user side apparatus 1 (Step S52). When this common secret information Su is inputted, the execution program EP1 reads out the inherent information to the contents C (hereinafter to be referred to as the contents inherent information) PID from the CD-ROM CD (Step S53), and have a conversion parameter generating unit 34 generate a conversion parameter KY from the inherent information and the common secret information Su (Step S54).

Next, the execution program EPI reads out, by the conversion parameter KY, hardware inherent information inherent to the user ID UID and the user side apparatus 1 or the information inherent to the OS (operating system) installed on the user side apparatus 1 (hereinafter to be referred to as the hard/OS inherent information) HID (Step S55), and have the data conversion unit 31 carry out data conversion by the conversion parameter KY by concatenating it with the user ID UID to generate the data C(HID//UID, KY) (Step S56), and present the data to the user.

When the user inputs the data C(HID//UID, KY) presented by the execution program EP1 again in the user side apparatus 1, the execution program EP1 causes it to transmit to the server side apparatus 2 through the communication line 3 (Step S57).

In the server side apparatus 2, when it receives the data C(HID//UID, KY) from the user side apparatus 1 through the communication line 3 (Step S72), the execution program EP2 causes the common secret information search unit 41 to search the user ID UID of plural users registered and stored in the data base 42 in advance to have it take out the corresponding registered common secret information Ss from the registered common secret information (Step S73). And, the execution program EP2 causes a conversion parameter generating unit 46 to generate a parameter KY from the common secret information Ss and the inherent information PID of the contents C (Step S74).

Next, in the server side apparatus 2, the execution program EP2 causes to have the data inverse conversion unit 43 to make inverse conversion of the data C(HID//UID, KY) previously received from the user side apparatus 1 by using the parameter KY generated by the conversion parameter generating unit 46 to obtain the data HID//UID (Step S75). Next, the execution program EP2 causes the comparing unit 45 to compare the data UID of the data HID//UID taken out by the data inverse conversion unit 43 with the user ID UID (Step S76).

If necessary, money charging is executed at the point of comparison of the user ID UID in the comparing unit 45.

If the comparison result by the comparing unit 45 coincide, the execution program EP2 newly causes to generate the random information (random number) R2 (Step S77), and the random number R2 and the hard/OS inherent information HID in the data HID//UID obtained previously in the data inverse conversion unit 43 are converted by the data conversion unit 44 with the conversion parameter KYD previously generated by the conversion parameter generating unit 46 to obtain the data C(R2//HID, KY) (Step S78). The data C(R2//HID, KY) thus obtained by the data conversion unit 44 is transmitted to the server side apparatus 2 through the communication line 3 (Step S79).

When this data C(R2//HID, KY) is received (Step S58), in the user side apparatus 1, the execution program EP1 causes to have the data inverse conversion unit 32 inversely convert the data C(R2//HID, KY) with the conversion parameter previously generated by the conversion parameter generating unit 34 to obtain a hard/OS inherent information (Step S51). The execution program EP1 causes the comparing unit 33 to compare the hard/OS inherent information HID obtained in the data inverse conversion unit 32 with the hard/OS inherent information HID of the user side apparatus 1 (Step S60), and if they show coincide, then it starts the self-uncompression program UP and have the uncompression of the compressed contents CC started (Step S61).

The invention is based on the principle as described above, and the practical embodiments are described below.

Figure 13:
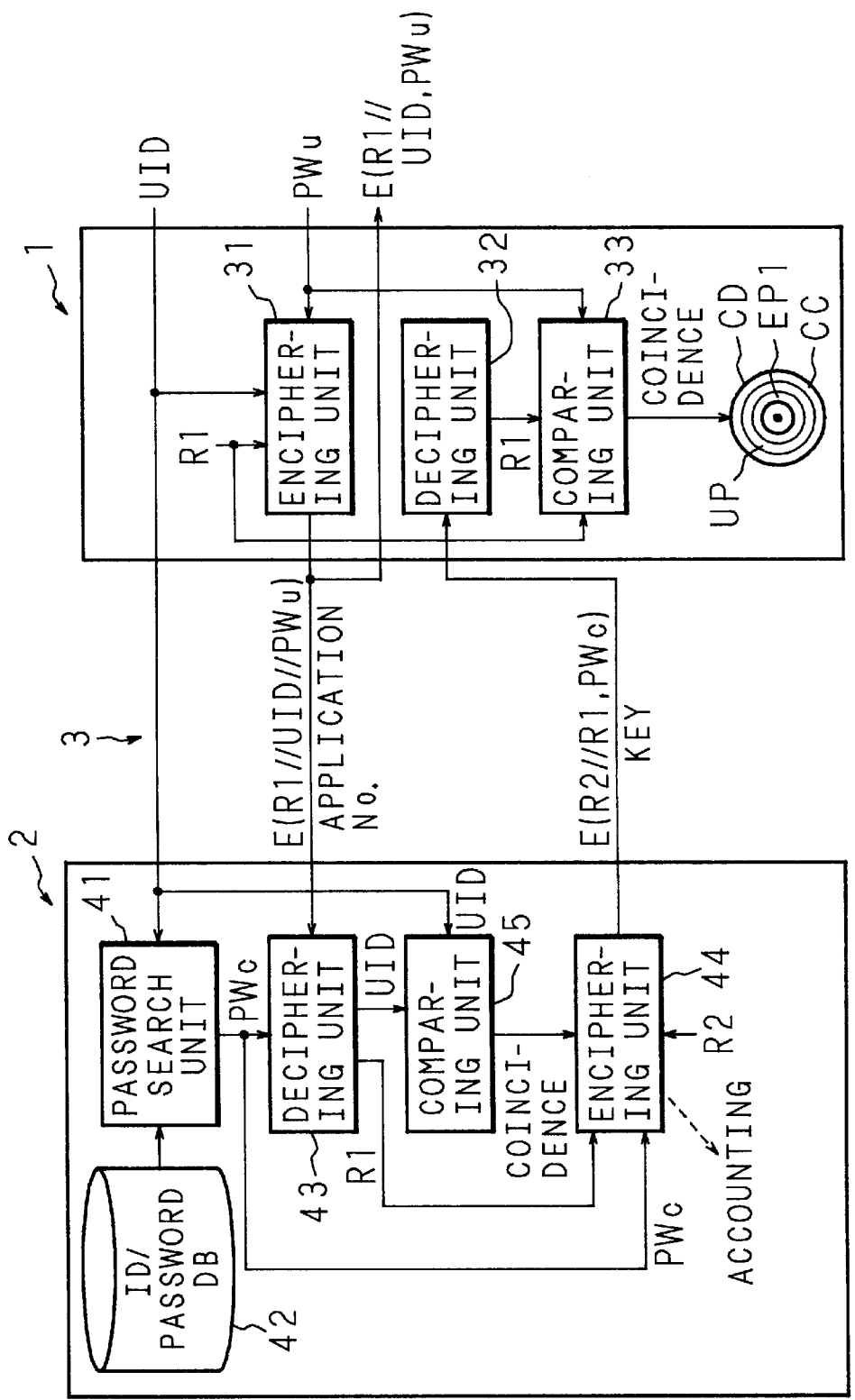
FIG. 13 is a schematic diagram for illustrating the first embodiment of the method of the present invention.

FIG. 13 is a schematic diagram for illustrating the first embodiment of the method of the present invention. In any embodiment to be described below, the user side apparatus 1 uses a computer system to be used by the user who utilizes the electronic information to be distributed with charge or free of charge by the method of the present invention, namely, contents, and the server side apparatus 2 uses a management side apparatus to be operated by the party who distributes the contents C with charge or free of charge personally or by committing to the other party. The user side apparatus 1 and the server side apparatus 2 are connected for example by the communication line 3 such as an ordinary public telephone line, and the so-called computer communication can be made.

In the following embodiments, the contents C per se are recorded in the CD-ROM CD under the condition of the compressed digital data CC and distributed free of charge to the user as a self-uncompressing type software. In this CD-ROM CD there are recorded a program UP for self-uncompressing the digital data CC which is compressed, and an execution program EP1 for executing the execution program EP1 for the user side apparatus 1 which executes the processing for starting the uncompressing program UP. What is actually operated in the user side apparatus 1 is an execution program EP1, and what is actually operated in the server side apparatus 2 is an execution program EP2.

In FIG. 13, in the user side apparatus 1, firstly when the user inputs his own user ID UID, the execution program EP1 transmits it to the server side apparatus 2 through the communication line 3. Simultaneously with it, the user inputs the password PWu as a common secret information to the user side apparatus 1. When this password PWu is inputted, the execution program EP1 generates a random number R1, and using the password PWu as a parameter, causes the enciphering unit (data conversion unit) 31 to encipher the random number R1 and the user ID UID to generate the enciphered data E(R1//UID, PWu) and presents it as an application number to the user.

When the user again inputs the application number E(R1//UID, PWu) presented by the execution program EP1 to the user side apparatus 1, the execution program EP1 transmits it to the server side apparatus 2 through the communication line 3.

In the server side apparatus 2, when the user ID UID and the application number E(R1//UID, PWu) are received from the user side apparatus 1 through the communication line 3, the execution program EP2 causes the password search unit (common secret information search unit) 41 to search the user ID UID of plural users registered and stored in the ID/password data base 42 to have it take out the corresponding password PWu from the registered passwords. And, the execution program EP2 causes the deciphering unit (data inverse conversion unit) 43 to decipher the received application number E(R1//UID, PWu) with the registered password PWc taken out from the ID/password data base 42 to obtain a random number R1 and the user ID UID.

Next, in the server side apparatus 2, the execution program EP2 causes the comparing unit 45 to compare the user ID UID obtained by the deciphering unit 43 with the user ID UID which was previously received from the user side apparatus 1. When the comparison result coincides, the execution program EP2 newly generates a random number R2, and causes the enciphering unit (data conversion unit) 44 to encipher the data obtained by concatenating the random number R1 decoded in the deciphering unit 43 with the newly generated random number R2 using the registered password PWc read out from the ID/password data base 42, causes the enciphering unit 44 to generate a key E(R2//R1, PWc), and to transmit it to the user side apparatus 1 through the communication line 3. At the time when the key E(R2//R1,PWc) is generated in the enciphering unit 44, if money charging processing is necessary, such processing is executed.

In the user side apparatus 1 which has received this key E(R2//R1, PWc), the execution program EP1 causes the deciphering unit (data inverse conversion unit) 32 to convert inversely the key E(R2//R1, PWc) with the password PWu inputted previously by the user himself to obtain a random number R1. The execution program EPI causes the comparing unit 33 to compare the random number R1 obtained in the deciphering unit 32 with the random number R1 generated previously by its own, and if they show coincidence, then it starts the self-uncompression program UP to have the compressed contents CC start to be uncompressed.

As described above, in the first embodiment shown in FIG. 13, the user inputs the user ID UID and the password PWu to the user side apparatus 1. The user ID UID inputted by the user is transmitted to the server side apparatus 2 in plain text, and it is enciphered by the password PWu together with the random number RI and transmitted to the server side apparatus 2 as an application number.

In the server side apparatus 2, the user's registered password PWc which is stored in the ID/password data base 42 is searched from the user ID UID which is received in plain text, the application number is deciphered by it, and the resulting user ID UID is compared with the user ID UID which is received in plain text to make authentication of the user.

In the server side apparatus 2, the random number R1 which is obtained by deciphering the application number is enciphered again and transmitted to the user side apparatus 1 as a key, and in the user side apparatus 1, the random number R1 which is obtained by deciphering the key is compared with the random number R1 which is previously generated by himself and transmitted to the server side apparatus 2 to make authentication of the server.

Figure 14:
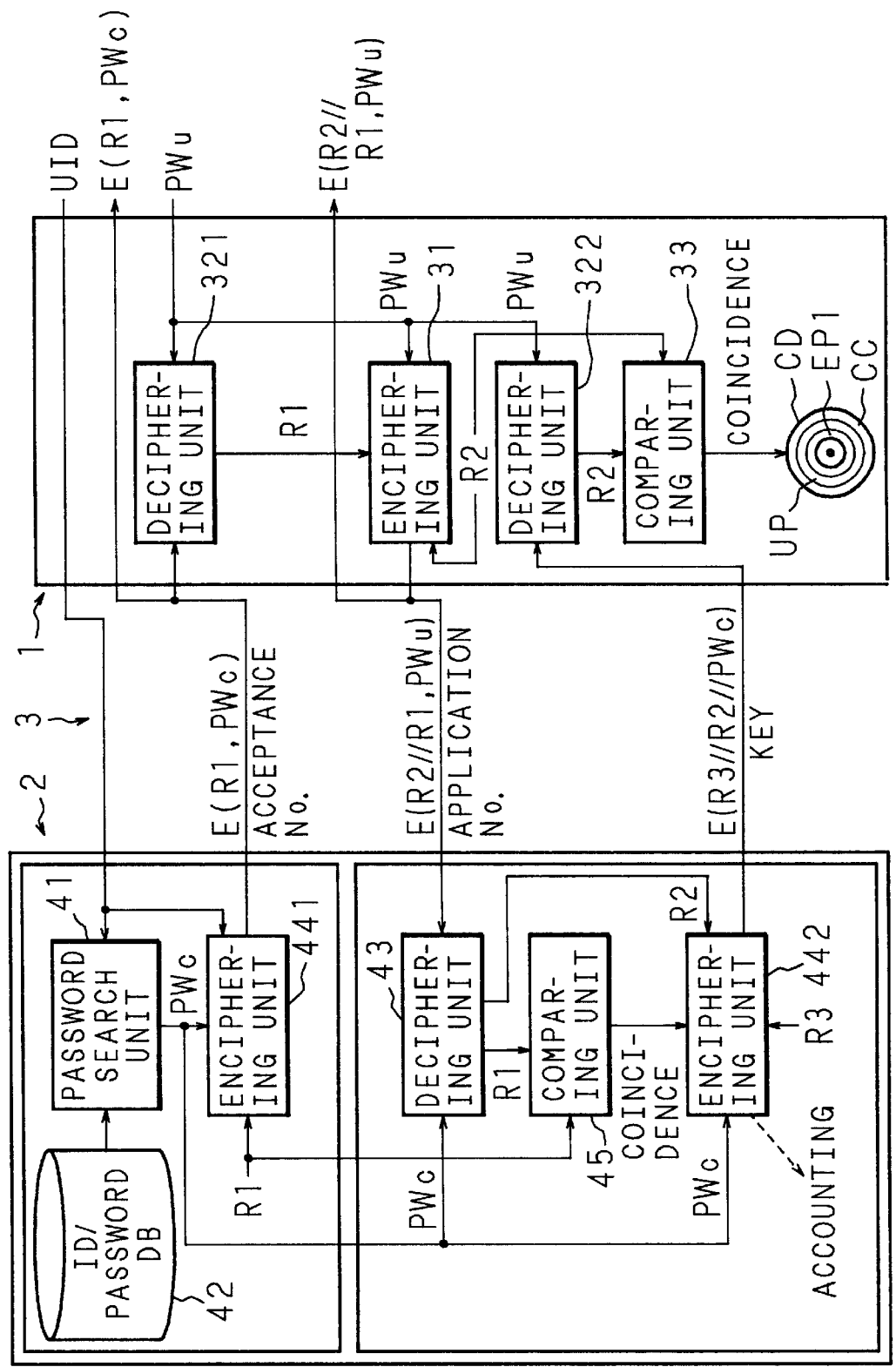
FIG. 14 is a schematic diagram for illustrating the second and third embodiments of the method of the present invention.

FIG. 14 is a schematic diagram for illustrating the second embodiment of the invention. In the user side apparatus 1, at first, when the user inputs his own user ID UID, the execution program EP1 causes it to be transmitted to the server side apparatus 2 through the communication line 3.

Against this, in the server side apparatus 2, the execution program EP2 generates the random number R1 and causes it to be transmitted to the user side apparatus 1 through the communication line 3, after enciphering it with the password corresponding to the user UID. Concretely, in the server side apparatus 2, the execution program EP2 causes the password search unit 41 to search the user ID of plural users previously registered and stored in the I/D password data base 42 according to the user ID UID received from the user side apparatus 1 and have it take out the corresponding password PWc from the registered common secret information. And, the execution program EP2 causes the enciphering unit 441 to encipher the random number RI by the registered password PWc taken out from the data base 42 to obtain the data E(R1, PWc). The execution program EP2 causes to transmit the data E(R1, PWc) obtained by the enciphering unit 441 as an acceptance number to the server side apparatus 2 through the communication line 3 to present to the user.

The user inputs the acceptance number E(R1, PWc) presented from the server side apparatus 2, password PWu, and the user ID UID in the user side apparatus 1. The execution program EP1 causes the deciphering unit 321 to decipher the acceptance number E(R1, PWc) by the password PWu inputted by the user to take out the random number R1. Next, the execution program EP1 newly generates the random number R2, concatenates it with the random number R1 obtained in the deciphering unit 321, and have it encipher with the password PWu to generate the data E(R2//R1, PWu), and present the resultant to the user as an application number.

When the user again inputs the application number E(R2//R1, PWu) presented by the execution program EP1 to the user side apparatus 1, the execution program EP1 transmits it to the server side apparatus 2 through the communication line 3.

In the server side apparatus 2, when the application number E(R2//R1, PWu) is received from the user side apparatus 1 through the communication line 3, the execution program EP2 causes the deciphering unit 43 to decipher the application number E(R2//R1, PWu) with the password PWc previously taken out from the ID/password data base 42 to obtain the random numbers R1, R2.

Next, in the server side apparatus 2, the execution program EP2 causes the comparing unit 45 to compare the random number R1 obtained by the deciphering unit 43 with the random number R1 which was previously enciphered and transmitted to the user side apparatus 1. When the comparison result coincides, the execution program EP2 newly generates a random number R3, and causes the enciphering unit 442 to encipher the data obtained by concatenating the random number R3 with the random number R2 which was previously obtained in the deciphering unit 43 using the registered password PWc read out from the data base 42, causes the enciphering unit 442 to generate a key E(R3//R2, PWc), and have it transmitted to the user side apparatus 1 through the communication line 3. At the time when the key E(R3//R2, PWc) is generated in the enciphering unit 442, if money charging processing is necessary, such processing is executed.

In the user side apparatus 1 which has received this key E(R3//R2, PWc), the execution program EP1 causes the deciphering unit 322 to decipher the password PWu previously inputted by the user himself with the key E(R3//R2, PWc) to obtain random numbers R2, R3. The execution program EP1 causes the comparing unit 33 to compare the random number R2 obtained in the deciphering unit 322 with the random number R2 generated previously by its own, and if they show coincidence, then it starts the self-uncompression program UP to have the compressed contents CC start to be uncompressed.

As reviewed above, in the second embodiment shown in FIG. 14, the random number R1 is enciphered by the user's registered password PWc and transmitted as an acceptance number to the user side apparatus 1. In the user side apparatus 1, the random number RI which is obtained by deciphering the acceptance number with the password PWu which is inputted again by the user is enciphered by the password PWu together with the newly generated random number R2 and transmitted to the server side apparatus 2 as an application number. In the server side apparatus 2, the random number RI which is obtained by deciphering the application number by the user's registered password PWc is compared with the random number R1 which was previously generated by its own, enciphered and transmitted to the user side apparatus 1 to carry out user authentication.

In the server side apparatus 2, the random number R2 which is obtained by deciphering the application number is enciphered again by the user's registered password PWc and transmitted to the user side apparatus 1 as a key, and in the user side apparatus 1, the random number R2 which is obtained by deciphering the key by the password PWu inputted by the user is compared with the random number R2 which was previously transmitted to the user side apparatus 1 to make authentication of the server.

As the third embodiment, in the second embodiment shown in the schematic view of FIG. 14 above, in transmitting the random number R1 by enciphering from the server side apparatus 2 to the user side apparatus 1, the transmission may be made in a plain text.

Figure 15:
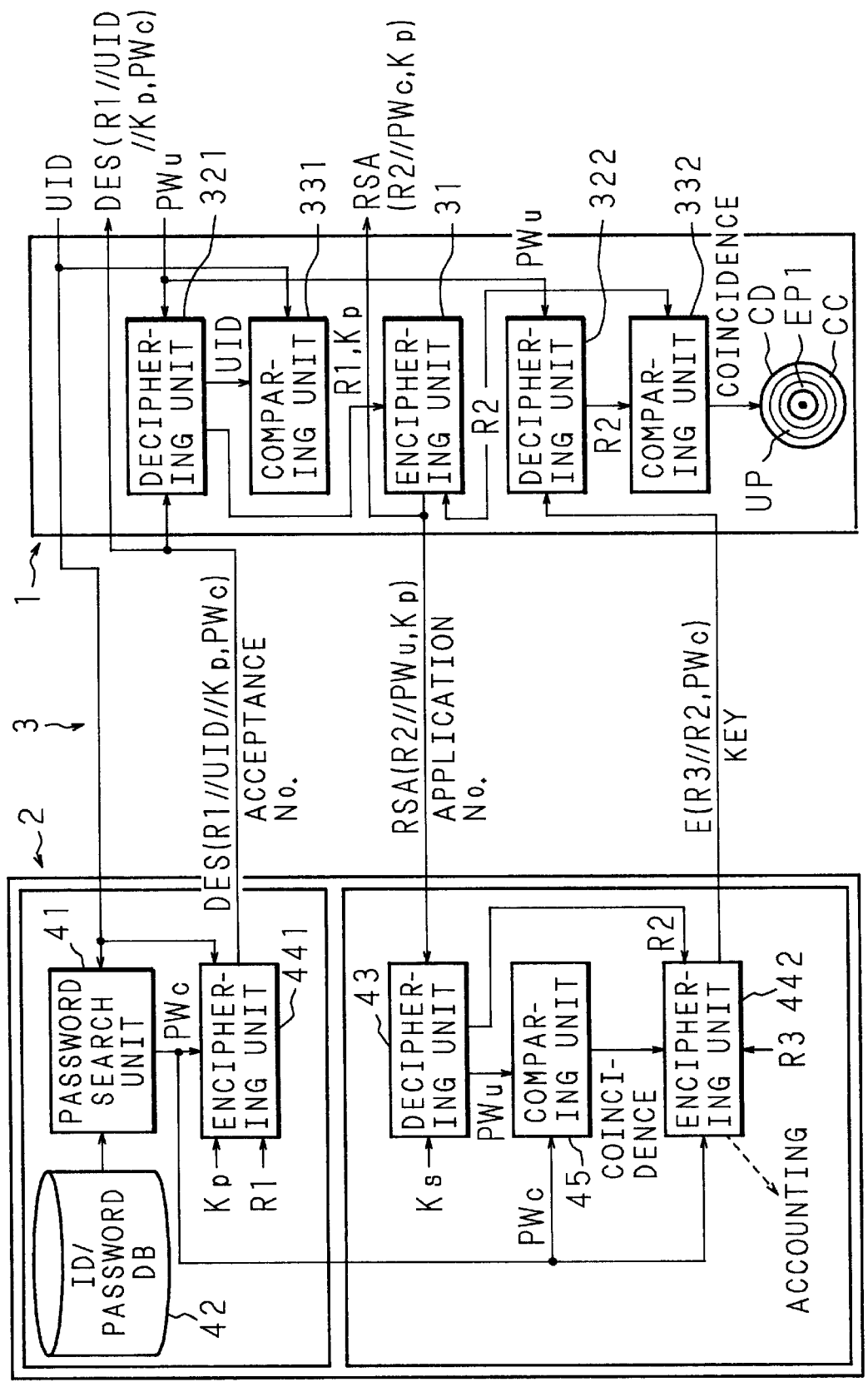
FIG. 15 is a schematic diagram for illustrating the fourth embodiment of the method of the present invention.

FIG. 15 is a schematic view for illustrating the fourth embodiment of the method of the present invention. In the user side apparatus 1, when the user inputs his own user ID UID, the execution program EP1 causes it to transmit to the server side apparatus 2 through the communication line 3.

Against this, in the server side apparatus 2, the execution program EP2 causes the password search unit 41 to search the user IDs of the plural users previously registered and stored in the ID/password data base 42 according to the user ID UID received from the user side apparatus 1 and causes it to take out the corresponding password PWc from the registered common secret information. Next, the execution program EP2 generates a random number R1. And, the execution program EP2 causes the enciphering unit 441 to encipher the random number R1, user ID UID, and the predetermined key Kp open in public on the server side to have the data DES(R1//UID//Kp, PWc) generated, and causes to transmit it as acceptance number to the user side apparatus 1 through the communication line 3. The user side apparatus 1 presents the acceptance number to the user.

The user inputs the acceptance number DES(R1//UID//Kp, PWc) presented from the server side apparatus 2, user ID UID, and the password PWu in the user side apparatus 1. The execution program EP1 causes the deciphering unit 321 to decipher the acceptance number DES(R1//UID//Kp, PWc) by the password PWu to take out the data R1, UID. And, the execution program EP1 causes to have the comparing unit 331 to compare the deciphered UID in the deciphering unit 321 with the user ID UID previously inputted by the user. When the comparison result by the comparing unit 331 show coincidence, the execution program EP1 newly generates a random number R2, concatenates the random number R2 with the password PWu to have the enciphering unit 31 encipher by the public key Kp which was previously deciphered by the deciphering unit 321, and presents the resulting data RSA(R2//PWu, Kp) as an application number to the user.

When the user again inputs the application number RSA(R2//PWu, Kp) presented by the execution program EP1 to the user side apparatus 1, the execution program EP1 transmits it to the server side apparatus 2 through the communication line 3.

In the server side apparatus 2, when the application number RSA(R2//PWu, Kp) is received from the user side apparatus 1 through the communication line 3, the execution program EP2 causes the deciphering unit 43 to decipher the application number with the secret key Ks to obtain the random number R2 and the password PWu.

Next, in the server side apparatus 2, the execution program EP2 causes the comparing unit 45 to compare the password PWu taken out by the deciphering unit 43 with the registered password PWc previously taken out from the ID/password data base 42 by the password search unit 41. When the comparison result coincides, the execution program EP2 newly generates a random number R3, and causes the enciphering unit 442 to generate the enciphered data E(R3//R2, PWc) by concatenating the random number R3 with the random number R2 which was previously obtained in the deciphering unit 43 using the registered password PWc read out from the data base 42, causes the enciphering unit 442 to generate a key E(R3//R2, PWc). The data E(R3//R2, PWc), as a key, is transmitted to the user side apparatus 1 through the communication line 3. At the time when the key E(R3//R2, PWc) is generated in the enciphering unit 442, if money charging processing is necessary, such processing is executed.

In the user side apparatus 1 which has received this key E(R3//R2, PWc), the execution program EPI causes the comparing unit 332 to decipher the key E(R3//R2, PWc) with the password PWu previously inputted by the user to obtain random numbers R2, R3. The execution program EP1 causes the comparing unit 332 to compare the random number R2 obtained in the deciphering unit 322 with the random number R2 generated previously by its own, and if they show coincidence, then it starts the self-uncompression program UP to have the compressed contents CC start to be uncompressed.

As reviewed above, in the fourth embodiment shown in FIG. 15, the user ID UID is transmitted from the user side apparatus 1 in plain text. In the server side apparatus 2, it is enciphered with the user's registered password and transmitted to the user side apparatus 1 as the acceptance number. In the user side apparatus 1, by making comparison between the user ID UID obtained by deciphering the acceptance number with the password PWu inputted by the user and the user ID UID inputted by the user himself, a server authentication is performed.

The acceptance number includes the random number R1 which is generated in the server side apparatus 2 and the public key Kp in enciphered state. Therefore, in the user side apparatus 1, a random number R2 is newly generated and enciphered with the public Kp along with the password PWu inputted by the user, and the acceptance number is transmitted to the server side apparatus 2 as the application number. In the server side apparatus 2, the password PWu made by deciphering the application number by the secret key Ks is compared with the registered password PWc to carry out user authentication.

Further, as the application number includes the random number R2 generated by the user side apparatus 1 by being enciphered, in the server side apparatus 2, a random number R3 is newly generated and enciphered by the registered password PWc and transmit it as a key to the user side apparatus 1. In the user side apparatus 1, by comparing the random number R2 which is obtained by deciphering the key by the password PWu inputted by the user himself is compared with the random number R2 which was previously transmitted by himself to the server side apparatus 1, authentication of the server is made again.

Figure 16:
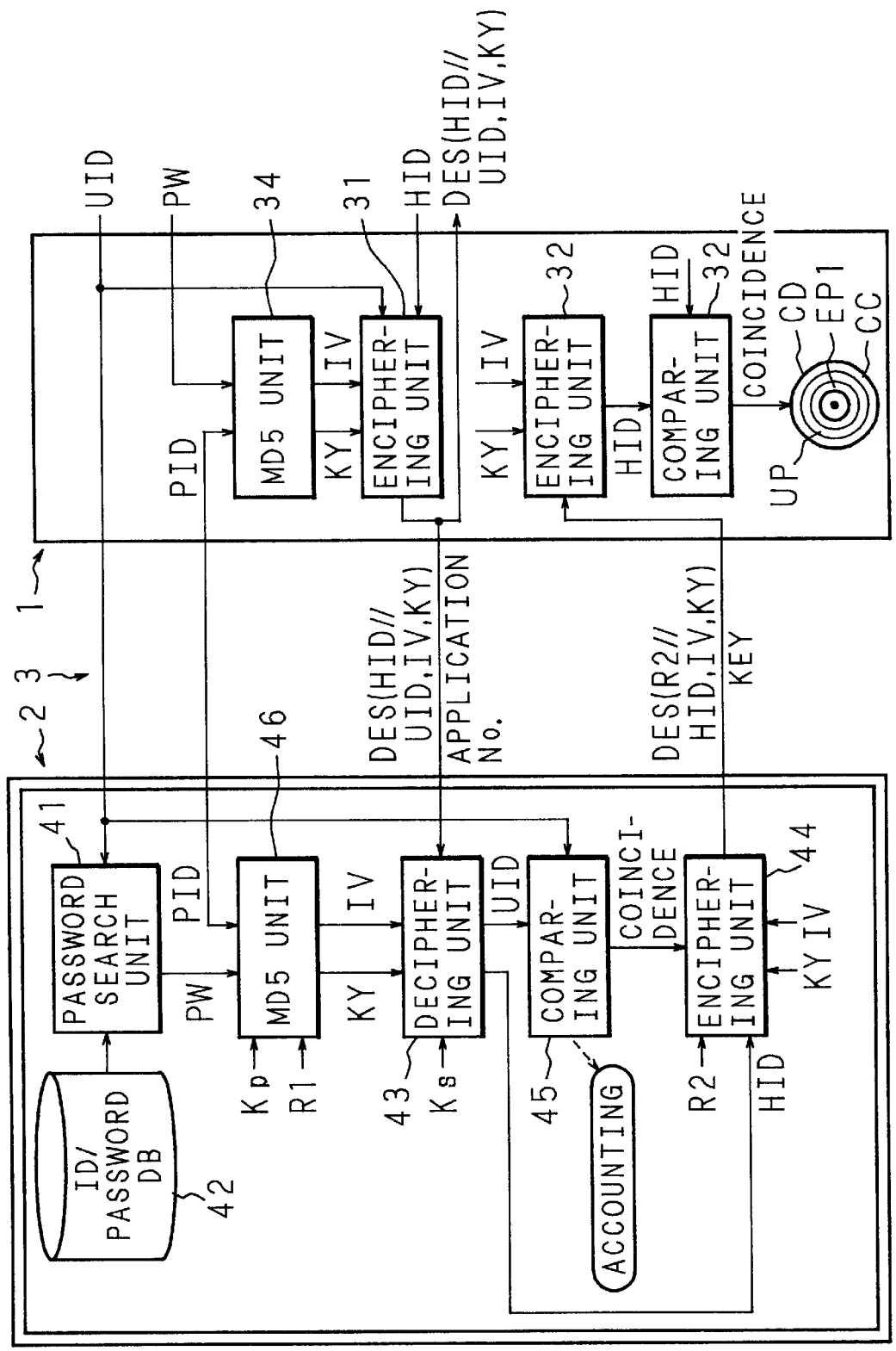
FIG. 16 is a schematic diagram for illustrating the fifth embodiment of the method of the present invention.

FIG. 16 is a schematic view for illustrating the fifth embodiment of the method of the present invention. In the user side apparatus 1, when the user inputs his own user ID UID, password PWu, and the contents inherent information (hereinafter to be referred to as contents ID) PID, the execution program EP1 provides the password PWu and the contents ID PID with processings by one-directional function to generate an enciphering key KY and the initial vector IV to the MD5 unit 34. The contents ID is, for example, a number described on the label of CD-ROM CD or the like, or CD-ROM CD per se.

Next, the execution program EP1 causes the enciphering unit 31 to encipher the user ID UID and the hard/OS inherent information HID by the enciphering key KY and the initial vector IV generated by the MD5 unit 34 to obtain a data DES(HID//UID, IV, KY). This data DES(HID//UID, IV, KY) is presented to the user as an application number. The hard/OS inherent information HID is the inherent information provided on the hardware inherent to the user side apparatus 1, e.g., CPU, HDD, etc. or the information inherent to the OS (operating system) installed in the user side apparatus 1.

When the user inputs the application number DES(HID//UID, IV, KY) to the user side apparatus 1, the execution program EP1 causes to transmit it to the server side apparatus 2 through the communication line 3.

In the server side apparatus 2, on receipt of the application number DES(HID//UID, IV, KY) from the user side apparatus 1 through the communication line 3, the execution program EP2 causes the password search unit 41 to search the user IDs of the plural users previously registered and stored in the ID/password data base 42 according to the user ID UID previously received and causes it to take out the corresponding password PWc from the registered common secret information. And, the execution program EP2 causes the MD5 unit 46 to provide processings by one-directional function to the registered password PWc and the contents ID PID previously received from the server side apparatus 2 to generate enciphering key KY and the initial vector IV.

Next, in the server side apparatus 2, the execution program EP2 causes the deciphering unit 43 to decipher the application number DES(HID//UID, IV, KY) previously received from the server side apparatus 2 by the enciphering key KY and the initial vector IV generated in the MD5 unit 46 and take out the data HID//UID. And, the execution program EP2 causes the comparing unit 45 to compare the user ID UID taken out by the deciphering unit 43 with the user ID UID previously received from the server side apparatus 2. At the time of comparison in the comparing unit 45, if money charging processing is necessary, such processing is executed.

If the comparison result by the comparing unit 45 show coincidence, the execution program EP2 newly generates the random number R2, and using the random number R2, the enciphering key KY previously obtained by MD5 unit 46, and the initial vector IV, the program causes the enciphering unit 44 to encipher the random number R2 and the hard/OS inherent information HID to obtain a data DES (R2//HID, IV, KY). The data DES(R2//HID, IV, KY) obtained by the enciphering unit 44 is transmitted as a key to the server side apparatus 2 through the communication line 3.

In the user side apparatus 1 which has received this key DES(R2//HID, IV, KY), the execution program EP1 causes the deciphering unit 32 to decipher the key DES(R2//HID, IV, KY)with the enciphering key KY and the initial vector previously generated by the MD5 unit 34 to obtain hard/OS inherent information HID. The execution program EP1 causes the comparing unit 33 to compare the hard/OS inherent information HID obtained in the deciphering unit 32 with the hard/OS inherent information HID of the user side apparatus 1, and if they show coincidence, then it starts the self-uncompression program UP to have the compressed contents CC start to be uncompressed.

As reviewed above, according to the fifth embodiment shown in FIG. 16, the user ID UID and the contents ID PID are transmitted from the user side apparatus 1 in plain text. In the server side apparatus 2, the user's registered password PWc and the contents ID PID are processed with the one-directional function to generate an enciphered key KY and the initial vector IV. On the other hand, on the user side apparatus 1, the password inputted by the user himself PWu and the contents ID PID are processed with the one-directional function to generate an enciphering key KY and the initial vector IV, and the user ID UID and the hard/OS inherent information HID are enciphered and transmitted as the application number to the server side apparatus 2. In the server side apparatus 2, user authentication is made by comparing the user ID UID obtained by deciphering the application number by the enciphering key KY generated by its own and the initial vector IV with the user ID UID transmitted from the user side apparatus 1 in plain text.

In the application number, there is included the hard/OS inherent information HID of the user side apparatus 1 by enciphered state. Therefore, in the server side apparatus 2, it is again enciphered with the enciphering key KY and the initial vector IV and transmitted as the key to the user side apparatus. In the user side apparatus 1, the received key is deciphered by the enciphering key KY and the initial vector IV and comparison is made between the resulting hard/OS inherent information HID and the own hard/OS inherent information HID to carry out server authentication.

In each embodiment given above, the user's password is used as the common secret information. However, it is possible to take such method that one side uses the public key and enciphers the information, and the other side uses the secret key and restoring the enciphered information.

Also, there is an embodiment wherein, after the acceptance number or application number is once presented to the user, it is re-entered in the user side apparatus 1, and then transmitted to the server side apparatus 2. However, needless to say, the transmission may be made automatically to the server side apparatus 2 without the intervention of the user.

As described in detail above, according to the present invention, as it does not occur that the contents are enciphered by the user's password on the server side and transmitted to the user side, there is no necessity for the contents to be enciphered, and the load of the server side decreases. Also, as the enciphered contents are not transmitted, it becomes possible to curtail the communication cost, and moreover it does not occur that the error is generated during the communication and the receiving of perfect contents on the user side is prevented.

In addition, according to the invention, as there is no necessity to manage the deciphering key on the server side in the unit of the contents, there is no apprehension for the deciphering key to be leaked. Accordingly, in case of distributing the electronic information (contents) with charge, the apprehension to sustain economic loss decreases.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electronic information distribution method for distributing an electronic information by starting a restoration program to restore a processed electronic information to an original electronic information by giving indication to a user side apparatus capable of reading a recording medium, in which said processed electronic information made by providing said original electronic information to be distributed with the predetermined processing and said restoration program for restoring said processed electronic information to the condition prior to the processing are recorded, through the communication line from a management side apparatus, comprising:

generating by said user side apparatus a first information at random, a second information by providing said first information with a first processing which can be inversely processed with said management side apparatus, and transmitting said second information to said management side apparatus;

restoring with said management side apparatus the first information by providing the second information received from said user side apparatus with a processing inverse to said first processing, said processing inverse to said first processing including retrieving a fourth information from a database, generating a third information by providing the restored first information with a second processing which can be inversely processed by said user side apparatus, and transmitting said third information to said user side apparatus; and restoring with said user side apparatus the first information by providing the third information received from said management side apparatus with a processing inverse to said second processing, comparing said restored first information with said user side generated first information, and restoring said processed electronic information by starting said restoration program when the two data show coincidence.

2. An electronic information distribution method for distributing an electronic information by starting a restoration program to restore a processed electronic information to an original electronic information by giving indication to a user side apparatus capable of reading a recording medium, in which said processed electronic information made by providing said original electronic information to be distributed with the predetermined processing and said restoration program for restoring said processed electronic information to the condition prior to the processing are recorded, through the communication line from a management side apparatus, comprising:

generating with said management side apparatus a first information at random, and transmitting said first information to said user side apparatus;

generating with said user side apparatus a second information at random, generating a third information by providing said second information and the first information received from said management side apparatus with a first processing which can be inversely processed with said management side apparatus, and transmitting said third information to said management side apparatus;

restoring with said management side apparatus the first information and the second information by providing the third information received from said user side apparatus with a processing inverse to said first processing, said processing inverse to said first processing including retrieving a fifth information from a database. comparing said restored first information with said user side generated first information, generating a fourth information by providing said restored second information with a second processing which can be inversely processed by said user side apparatus when the two data show coincidence, and transmitting said fourth information to said user side apparatus, and restoring the second information by providing the fourth information received from said management side apparatus with a processing inverse to said second processing, comparing said restored second information with said user side generated second information, and restoring said processed electronic information by starting said restoration program when the two data show coincidence.

3. The electronic information distribution method as set forth in claim 2, wherein said management side apparatus processes said first information by using common information co-owned by said user side apparatus and said management side apparatus, and transmitting the common information to said user side apparatus, and said user side apparatus once presents externally the processed first information received from said management side apparatus, and in case the presented information is re-inputted, provides the presented information with said first processing.

4. An electronic information distribution method for distributing an electronic information by starting a restoration program to restore a processed electronic information to an original electronic information by giving indication to a user side apparatus capable of reading a recording medium, in which said processed electronic information made by providing said original electronic information to be distributed with the predetermined processing and said restoration program for restoring said processed electronic information to the condition prior to the processing are recorded, through the communication line from a management side apparatus, comprising:

generating with said user side apparatus a parameter by using a first information inherent to said electronic information and a common information co-owned by said user side apparatus and said management side apparatus, generating a third information by providing an inherent second information related to said user side apparatus with a first processing based on said parameter, and transmitting said third information to said management side apparatus;

generating with said management side apparatus said parameter from said first information and said common information being retrieved from a database, restoring the second information by providing the third information received from said user side apparatus with a processing inverse to said first processing by using said parameter, generating a fourth information by providing said restored second information with a second processing by using said parameter, and transmitting said fourth information to said user side apparatus, and restoring with said user side apparatus the second information by providing the fourth information received from said management side apparatus with a processing inverse to said second processing by using said parameter, comparing said restored second information with said inherent second information related to said user side apparatus, and restoring said processed electronic information by starting said restoration program when the two data show coincidence.

5. The electronic information distribution method as set forth in claim 4, wherein said inherent second information related to said user side apparatus is any one or plurality of an information for identifying the user, an information inherent to said user side apparatus, or an information inherent to an operating system of said user side apparatus.

6. A computer program product for an electronic information distribution system from a management side apparatus to a user side apparatus, comprising:

a computer usable storage medium used at said user side apparatus and having computer readable program code for distributing said electronic information by starting a restoration program to restore a processed electronic information to an original electronic information by giving indication to a user side apparatus capable of reading a recording medium, in which said processed electronic information made by providing said original electronic information to be distributed with the predetermined processing and said restoration program for restoring said processed electronic information to the condition prior to the processing are recorded, through the communication line from a management side apparatus, said computer readable program code comprising:

computer readable program code for causing a computer to generate a first information at random;

computer readable program code for causing a computer to generate a second information by providing said first information with a first processing which can be inversely processed with said management side apparatus;

computer readable program code for causing a computer to transmit said second information to said management side apparatus;

computer readable program code for causing a computer to receive a fourth information generated and transmitted by said management side apparatus by providing the first information, which is restored by providing the second information received from said user side apparatus with a processing inverse to said first processing, said processing inverse to said first processing including retrieving a fifth information from a database, with a second processing which can be inversely processed by said user side apparatus;

computer readable program code for causing a computer to restore the first information by providing the fourth information received from said management side apparatus with a processing inverse to said second processing;

computer readable program code for causing a computer to compare said restored first information with said first information generated by itself; and computer readable program code for causing a computer to start said restoration program when the comparison result between the two data show coincidence.

7. A computer program product for electronic information distribution system from a management side apparatus to a user side apparatus, comprising:

a computer usable storage medium used at said management side apparatus and having computer readable program code for distributing said electronic information by starting a restoration program to restore a processed electronic information to an original electronic information by giving indication to a user side apparatus capable of reading a recording medium, in which said processed electronic information made by providing said original electronic information to be distributed with the predetermined processing and said restoration program for restoring said processed electronic information to the condition prior to the processing are recorded, through the communication line from a management side apparatus, said computer readable program code comprising:

computer readable program code for causing a computer to receive a second information generated and transmitted by said user side apparatus by providing a first information, which is generated at random with a first processing that can be inversely processed by said management side apparatus;

computer readable program code for causing a computer to restore the first information by providing the received second information with a processing inverse to said first processing, said processing inverse to said first processing including retrieving a fifth information from a database;

computer readable program code for causing a computer to generate a fourth information by providing the restored first information with a second processing which can be inversely processed with said user side apparatus; and computer readable program code for causing a computer to transmit the fourth information to said user side apparatus.

8. A computer program product for electronic information distribution system from a management side apparatus to a user side apparatus, comprising:

a computer usable storage medium used at said user side apparatus and having computer readable program code for distributing said electronic information by starting a restoration program to restore a processed electronic information to an original electronic information by giving indication to a user side apparatus capable of reading a recording medium, in which said processed electronic information made by providing said original electronic information to be distributed with the predetermined processing and said restoration program for restoring said processed electronic information to the condition prior to the processing are recorded, through the communication line from a management side apparatus, said computer readable program code comprising:

computer readable program code for causing a computer to receive a first information generated at random and transmitted by said management side apparatus;

computer readable program code for causing a computer to generate a second information at random;

computer readable program code for causing a computer to generate a third information by providing said second information and said first information received from said management side apparatus with a first processing that can be processed inversely by said management side apparatus;

computer readable program code for causing a computer to transmit said third information to said management side apparatus;

computer readable program code for causing a computer to receive a fourth information generated and transmitted by said management side apparatus by providing the third information received from said user side apparatus with a processing inverse to said first processing, said processing inverse to said first processing including retrieving a fifth information from a database, to restore said first information and said second information, comparing said restored first information with said first information generated by itself, and the restored second information is provided with a second processing which can be inversely processed by said user side apparatus when the two data show coincidence;

computer readable program code for causing a computer to restore the second information by providing said received fourth information with a processing inverse to said second processing;

computer readable program code for causing a computer to compare said restored second information with said second information generated by itself; and computer readable program code for causing a computer to start said restoration program when the comparison result between the two data show coincidence.

9. A computer program product for an electronic information distribution system from a management side apparatus to a user side apparatus, comprising:

a computer usable storage medium used at said management side apparatus and having computer readable program code for distributing said electronic information by starting a restoration program to restore a processed electronic information to an original electronic information by giving indication to a user side apparatus capable of reading a recording medium, in which said processed electronic information made by providing said original electronic information to be distributed with the predetermined processing and said restoration program for restoring said processed electronic information to the condition prior to the processing are recorded, through the communication line from a management side apparatus, said computer readable program code comprising:

computer readable program code for causing a computer to generate a first information at random;

computer readable program code for causing a computer to transmit said first information to said user side apparatus;

computer readable program code for causing a computer to receive a third information generated and transmitted by said user side apparatus by providing a second information generated at random and the first information received from said management side apparatus with a first processing which can be inversely processed with said management side apparatus;

computer readable program code for causing a computer to restore the first information and the second information by providing said third information received from said user side apparatus with a processing inverse to said first processing, said processing inverse to said first processing including retrieving a fifth information from a database;

computer readable program code for causing a computer to compare said restored first information with said first information generated by itself;

computer readable program code for causing a computer to generate a fourth information by providing said restored second information with a second processing which can be inversely processed with said user side apparatus when the comparison result between the two data show coincidence; and computer readable program code for causing a computer to transmit said fourth information to said user side apparatus.

10. A computer program product for an electronic information distribution system from a management side apparatus to a user side apparatus, comprising:

a computer usable storage medium used at said user side apparatus and having computer readable program code for distributing said electronic information by starting a restoration program to restore a processed electronic information to an original electronic information by giving indication to a user side apparatus capable of reading a recording medium, in which said processed electronic information made by providing said original electronic information to be distributed with the predetermined processing and said restoration program for restoring said processed electronic information to the condition prior to the processing are recorded, through the communication line from a management side apparatus, said computer readable program code comprising:

computer readable program code for causing a computer to generate a parameter by using a first information inherent to said electronic information and a common information previously co-owned by said user side apparatus and said management side apparatus;

computer readable program code for causing a computer to generate a third information by providing an inherent second information related to said user side apparatus with a first processing based on said parameter;

computer readable program code for causing a computer to transmit said third information to said management side apparatus;

computer readable program code for causing a computer to receive a fourth information generated and transmitted by said management side apparatus by providing the third information received from said user side apparatus with a processing inverse to said first processing to restore the second information by using said parameter generated from said first information and said common information being retrieved from a database, and providing said restored second information with said second processing by using said parameter;

computer readable program code for causing a computer to restore the second information by providing said received fourth information with a processing inverse to said second processing;

computer readable program code for causing a computer to compare said restored second information with said inherent second information related to said user side apparatus; and computer readable program code for causing a computer to start said restoration program when the comparison result between the two data show coincidence.

11. The computer program product as set forth in claim 10, wherein said inherent second information related to said user side apparatus is any one or plurality of an information for identifying the user, an information inherent to said user side apparatus, or an information inherent to an operating system of said user side apparatus.

12. A computer program product for electronic information distribution system from a management side apparatus to a user side apparatus, comprising:

a computer usable storage medium used at said management side apparatus and having computer readable program code for distributing said electronic information by starting a restoration program to restore a processed electronic information to an original electronic information by giving indication to a user side apparatus capable of reading a recording medium in which said processed electronic information made by providing the electronic information to be distributed with the predetermined processing and said restoration program for restoring said processed electronic information to the condition prior to the processing are recorded, through the communication line from a management side apparatus, said computer readable program code comprising:

computer readable program code for causing a computer to receive a third information generated and transmitted by said user side apparatus by providing an inherent second information related to said user side apparatus with a first processing based on a parameter which is generated by using a common information previously co-owned by said first information inherent to said electronic information;

computer readable program code for causing a computer to generate said parameter from said first information and said common information being retrieved from a database;

computer readable program code for causing a computer to restore the second information by providing the third information received from said user side apparatus with a processing inverse to said first processing by using said parameter;

computer readable program code for causing a computer to generate a fourth information by providing said restored second information with a second processing by using said parameter; and computer readable program code for causing a computer to transmit said fourth information to said user side apparatus.

13. The computer program product as set forth in claim 12, wherein said inherent second information related to said user side apparatus is any one or a plurality of information for identifying the user, information inherent to said user side apparatus, or information inherent to an operating system of said user side apparatus.

14. An electronic information distribution method, comprising:

transferring processed electronic information to a user side apparatus as recorded electronic information;

internally generating by said user side apparatus a first information at random, processing the first information to produce second information, and transmitting the second information to a management side apparatus;

restoring with said management side apparatus the first information with a processing inverse to said processing of the first information and including retrieving a fourth information from a database, from the received second information, processing the first information to produce third information, and transmitting the third information to the user side apparatus; and restoring with said user side apparatus the first information by processing the received third information, comparing the restored first information with the internally generated first information, and restoring said recorded processed electronic information upon coincidence.

15. An electronic information distribution system, comprising:

a user side apparatus receiving recorded processed electronic information, internally generating a first information at random, processing the first information to produce second information, and transmitting the second information; and a management side apparatus receiving the second information, restoring the second information into the first information with a processing inverse to said processing of the first information and including retrieving a fourth information from a database. processing the first information to produce third information, and transmitting the third information to said user side apparatus, said user side apparatus restoring the first information by processing the received third information, comparing the restored first information with the internally generated first information, and restoring said recorded processed electronic information upon coincidence.

16. An electronic information distribution system, comprising:

a user side computer apparatus storing code to receive recorded processed electronic information, internally generate a first information at random, process the first information to produce second information, with a processing inverse to said processing of the first information and including retrieving a fourth information from a database. and transmit the second information; and a management side computing apparatus storing code to receive the second information, restore the second information into the first information, process the first information to produce third information, and transmit the third information to said user side apparatus, said user side apparatus storing code to restore the first information by processing the received third information, compare the restored first information with the internally generated first information, and restore said recorded processed electronic information upon coincidence.

* * * * *